United States Patent
Alderson et al.

(10) Patent No.: US 7,283,165 B2
(45) Date of Patent: Oct. 16, 2007

(54) METHOD AND APPARATUS FOR IMAGE PROCESSING USING WEIGHTED DEFECTIVE PIXEL REPLACEMENT

(75) Inventors: Timothy Alderson, Winter Spring, FL (US); Gene D. Tener, Oviedo, FL (US); Jeffrey M. Davis, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 935 days.

(21) Appl. No.: 10/294,608

(22) Filed: Nov. 15, 2002

(65) Prior Publication Data

US 2004/0096125 A1    May 20, 2004

(51) Int. Cl.
*H04N 9/64* (2006.01)

(52) U.S. Cl. ............... 348/246; 348/243; 348/248; 348/251

(58) Field of Classification Search ........ 348/241, 348/243, 246, 247, 251, 615, 616, 341, 248
See application file for complete search history.

(56) References Cited

U.S. PATENT DOCUMENTS

| | | | |
|---|---|---|---|
| 4,377,820 A | | 3/1983 | Reitmeier |
| 5,381,175 A | | 1/1995 | Sudo et al. |
| 5,532,484 A | | 7/1996 | Sweetser et al. |
| 5,920,344 A | | 7/1999 | Kim |
| 6,002,433 A | * | 12/1999 | Watanabe et al. ........ 348/246 |
| 6,181,830 B1 | | 1/2001 | Sato |
| 6,359,681 B1 | | 3/2002 | Housand et al. |
| 6,642,960 B1 | * | 11/2003 | Kohashi et al. .......... 348/246 |
| 6,724,945 B1 | * | 4/2004 | Yen et al. ............... 382/274 |
| 6,977,681 B1 | * | 12/2005 | Sasai ..................... 348/241 |
| 2002/0159101 A1 | | 10/2002 | Alderson et al. |
| 2002/0159648 A1 | | 10/2002 | Alderson et al. |
| 2002/0159651 A1 | | 10/2002 | Tener et al. |
| 2003/0043286 A1 | * | 3/2003 | Kato ..................... 348/246 |
| 2005/0030394 A1 | * | 2/2005 | Mendis et al. .......... 348/246 |
| 2005/0099516 A1 | * | 5/2005 | Kagle et al. ............ 348/246 |

OTHER PUBLICATIONS

"The IEEE Standard Dictionary of Electrical and Electronicds Terms: Sixth Edition", Dec. 10, 1996, pp. 459 and 666.*
Timothy Alderson et al., "Scene-based non-uniformity offset correction for staring arrays", U.S. Appl. No. 10/125,348, filed Apr. 19, 2002.

* cited by examiner

*Primary Examiner*—Vivek Srivastava
*Assistant Examiner*—Chriss S Yoder, III
(74) *Attorney, Agent, or Firm*—Buchanan Ingersoll & Rooney PC

(57) ABSTRACT

A method of processing image data comprises obtaining a set of weighting coefficients to be used in calculating replacement pixel values associated with defective sensing elements of a detector array, the set of weighting coefficients including at least one negative weighting coefficient, obtaining information identifying one or more defective sensing elements of the detector array, receiving image data from the detector array, calculating a weighted average of pixel values from sensing elements adjacent to a first defective sensing element of the detector array using at least some of the weighting coefficients, and assigning the weighted average to be a replacement pixel value for the first defective sensing element. An apparatus for processing image data according to the method is also described.

32 Claims, 29 Drawing Sheets

| 225 | 195 | 165 | 135 | 105 |
|-----|-----|-----|-----|-----|
| 195 | 165 | X   | 105 | 75  |
| 165 | 135 | 105 | 75  | 45  |

FIG. 3A. Sample Image (0 to 255 grayscale)

| -0.03325 | -0.3325 | 0.95 | -0.3325 | -0.03325 |
|----------|---------|------|---------|----------|
| 0.09975  | 0.95    |      | 0.95    | 0.09975  |
| -0.03325 | -0.3325 | 0.95 | -0.3325 | -0.03325 |

FIG. 3B. Weighting coefficients

| -7.481 | -64.84 | 156.75 | -44.89 | -3.491 |
|--------|--------|--------|--------|--------|
| 19.451 | 156.75 |        | 99.75  | 7.4813 |
| -5.486 | -44.89 | 99.75  | -24.94 | -1.496 |

FIG. 3C. Product of weighting coefficients and pixel values

| 225 | 195 | 165 | 135 | 105 |
|-----|-----|-----|-----|-----|
| 195 | 165 | 135 | 105 | 75  |
| 165 | 135 | 105 | 75  | 45  |

FIG. 3D. Resulting center pixel value

| 225 | 195 | 165 | 135 | 105 |
|-----|-----|-----|-----|-----|
| 195 | 165 | X   | 105 | 75  |
| 165 | 135 | 105 | 75  | 45  |

FIG. 4A. Sample Image (0-255 grayscale)

| --  | 195 | 165 | 135 | 105 |
|-----|-----|-----|-----|-----|
| 195 | 165 | X   | 105 | 75  |
| 165 | 135 | 105 | --  | 45  |

FIG. 4B. Example FPA condition -- 2 additional defective cells

| 0 | 0 | 1 | 0 | 0 |
|---|---|---|---|---|
| 1 | 1 | X | 1 | 1 |
| 0 | 0 | 1 | 0 | 0 |

FIG. 4C. Selected replacement mask

| -0.03325 | -0.3325 | 0.95 | -0.3325 | -0.03325 |
|----------|---------|------|---------|----------|
| 0.09975  | 0.95    |      | 0.95    | 0.09975  |
| -0.03325 | -0.3325 | 0.95 | -0.3325 | -0.03325 |

FIG. 4D. Weighting coefficients

| 0       | 0    | 0.95 | 0    | 0       |
|---------|------|------|------|---------|
| 0.09975 | 0.95 |      | 0.95 | 0.09975 |
| 0       | 0    | 0.95 | 0    | 0       |

FIG. 4E. Product of weighting coefficients and mask

| 0      | 0      | 156.75 | 0     | 0      |
|--------|--------|--------|-------|--------|
| 19.451 | 156.75 |        | 99.75 | 7.4813 |
| 0      | 0      | 99.75  | 0     | 0      |

FIG. 4F. Product of weighting coefficients, mask, and pixel values

| --  | 195 | 165 | 135 | 105 |
|-----|-----|-----|-----|-----|
| 195 | 165 | 135 | 105 | 75  |
| 165 | 135 | 105 | --  | 45  |

FIG. 4G. Resulting center pixel value

FIG. 5A

| | |
|---|---|
| X | = Defective Center Cell |
| (white) | = Good Neighboring Cell |
| (shaded) | = Defective/Excluded Neighboring Cell |
| (shaded) | = Defective/Excluded Cardinal cell |

| Rule Description for Mask | Mask Configuration | Decimal Equivalent |
|---|---|---|
| Mask 1<br>All cells good | 1 1 1 1 1<br>1 1 X 1 1<br>1 1 1 1 1 | 32639 |
| Mask 2<br>Top cardinal cell bad ⇒ exclude top inner corners | 1 0 0 0 1<br>1 1 X 1 1<br>1 1 1 1 1 | 32625 |
| Mask 3<br>Either outer middle cell bad ⇒ exclude both | 1 1 1 1 1<br>0 1 X 1 0<br>1 1 1 1 1 | 32095 |
| Mask 4<br>Either outer middle cell bad AND top cardinal cell bad ⇒ exclude top inner corners and outer middles | 1 0 0 0 1<br>0 1 X 1 0<br>1 1 1 1 1 | 32081 |
| Mask 5<br>Left cardinal cell bad ⇒ exclude left inner corners | 1 0 1 1 1<br>1 0 X 1 1<br>1 0 1 1 1 | 30525 |
| Mask 6<br>Either outer middle cell bad AND left cardinal cell bad ⇒ exclude left inner corners and outer middles | 1 0 1 1 1<br>0 0 X 1 0<br>1 0 1 1 1 | 29981 |
| Mask 7<br>Right cardinal cell bad ⇒ exclude right inner corners | 1 1 1 0 1<br>1 1 X 0 1<br>1 1 1 0 1 | 24183 |

FIG. 5B

| | |
|---|---|
| X | = Defective Center Cell |
| | = Good Neighboring Cell |
| ▓ | = Defective/Excluded Neighboring Cell |
| ░ | = Defective/Excluded Cardinal cell |

| Rule Description for Mask | Mask Configuration | Decimal Equivalent |
|---|---|---|
| Mask 8<br>Either outer middle cell bad<br>AND right cardinal cell bad<br>⇒ exclude right inner corners and outer middles | 1 1 1 0 1<br>0 1 X 0 0<br>1 1 1 0 1 | 23639 |
| Mask 9<br>Any inner corner bad ⇒ exclude all inner corners | 1 0 1 0 1<br>1 1 X 1 1<br>1 0 1 0 1 | 22389 |
| Mask 10<br>Top cardinal cell bad AND either bottom inner corner bad ⇒ exclude all inner corners | 1 0 0 0 1<br>1 1 X 1 1<br>1 0 1 0 1 | 22385 |
| Mask 11<br>Left cardinal cell bad AND either right inner corner bad ⇒ exclude all inner corners | 1 0 1 0 1<br>1 0 X 1 1<br>1 0 1 0 1 | 22325 |
| Mask 12<br>If ≥2 cardinal cells bad (top and left) ⇒ exclude all inner corners | 1 0 0 0 1<br>1 0 X 1 1<br>1 0 1 0 1 | 22321 |
| Mask 13<br>Right cardinal cell bad and either left inner corner bad ⇒ exclude all inner corners | 1 0 1 0 1<br>1 1 X 0 1<br>1 0 1 0 1 | 22133 |
| Mask 14<br>If ≥2 cardinal cells bad (top and right) ⇒ exclude all inner corners | 1 0 0 0 1<br>1 1 X 0 1<br>1 0 1 0 1 | 22129 |

FIG. 5C

| | |
|---|---|
| X | = Defective Center Cell |
| | = Good Neighboring Cell |
| ▓ | = Defective/Excluded Neighboring Cell |
| ░ | = Defective/Excluded Cardinal cell |

| Rule Description for Mask | Mask Configuration | Decimal Equivalent |
|---|---|---|
| Mask 15<br>If ≥2 cardinal cells bad (left and right) ⇒ exclude all inner corners | 1 0 1 0 1<br>1 0 X 0 1<br>1 0 1 0 1 | 22069 |
| Mask 16<br>If ≥2 cardinal cells bad (top, left, and right) ⇒ exclude all inner corners | 1 0 0 0 1<br>1 0 X 0 1<br>1 0 1 0 1 | 22065 |
| Mask 17<br>Either outer middle cell bad AND any inner corner bad ⇒ exclude all inner corners and outer middles | 1 0 1 0 1<br>0 1 X 1 0<br>1 0 1 0 1 | 21845 |
| Mask 18<br>Either outer middle cell bad AND top cardinal cell bad ⇒ exclude all inner corners and outer middles | 1 0 0 0 1<br>0 1 X 1 0<br>1 0 1 0 1 | 21841 |
| Mask 19<br>Either outer middle cell bad AND left cardinal cell bad ⇒ exclude all inner corners and outer middles | 1 0 1 0 1<br>0 0 X 1 0<br>1 0 1 0 1 | 21781 |
| Mask 20<br>Either outer middle cell bad AND ≥ 2 cardinal cells bad (top and left) ⇒ exclude all inner corners and outer middles | 1 0 0 0 1<br>0 0 X 1 0<br>1 0 1 0 1 | 21777 |
| Mask 21<br>Either outer middle cell bad AND right cardinal cell bad ⇒ exclude all inner corners and outer middles | 1 0 1 0 1<br>0 1 X 0 0<br>1 0 1 0 1 | 21589 |

FIG. 5D

| | |
|---|---|
| X | = Defective Center Cell |
| | = Good Neighboring Cell |
| ▨ | = Defective/Excluded Neighboring Cell |
| ▨ | = Defective/Excluded Cardinal cell |

| Rule Description for Mask | Mask Configuration | Decimal Equivalent |
|---|---|---|
| Mask 22<br>Either outer middle cell bad AND ≥2 cardinal cells bad (top and right)<br>⇒ exclude all inner corners and outer middles | 1,0,0,0,1 / 0,1,X,0,0 / 1,0,1,0,1 | 21585 |
| Mask 23<br>Either outer middle cell bad AND ≥2 cardinal cells bad (left and right)<br>⇒ exclude all inner corners and outer middles | 1,0,1,0,1 / 0,0,X,0,0 / 1,0,1,0,1 | 21525 |
| Mask 24<br>Either outer middle cell bad AND ≥2 cardinal cells bad (top, left, and right)<br>⇒ exclude all inner corners and outer middles | 1,0,0,0,1 / 0,0,X,0,0 / 1,0,1,0,1 | 21521 |
| Mask 25<br>Bottom cardinal cell ⇒ exclude bottom inner corners | 1,1,1,1,1 / 1,1,X,1,1 / 1,0,0,0,1 | 18303 |
| Mask 26<br>Bottom cardinal cell bad AND either top inner corner bad<br>⇒ exclude all inner corners | 1,0,1,0,1 / 1,1,X,1,1 / 1,0,0,0,1 | 18293 |
| Mask 27<br>If ≥2 cardinal cells bad (top and bottom)<br>⇒ exclude all inner corners | 1,0,0,0,1 / 1,1,X,1,1 / 1,0,0,0,1 | 18289 |
| Mask 28<br>If ≥2 cardinal cells bad (left and bottom)<br>⇒ exclude all inner corners | 1,0,1,0,1 / 1,0,X,1,1 / 1,0,0,0,1 | 18229 |

FIG. 5E

| | |
|---|---|
| X | = Defective Center Cell |
| | = Good Neighboring Cell |
| ▓ | = Defective/Excluded Neighboring Cell |
| ▒ | = Defective/Excluded Cardinal cell |

| Rule Description for Mask | Mask Configuration | Decimal Equivalent |
|---|---|---|
| Mask 29<br>If ≥2 cardinal cells bad (top, left, and bottom)<br>⇒ exclude all inner corners | 1 0 0 0 1<br>1 0 X 1 1<br>1 0 0 0 1 | 18225 |
| Mask 30<br>If ≥2 cardinal cells bad (right and bottom)<br>⇒ exclude all inner corners | 1 0 1 0 1<br>1 1 X 0 1<br>1 0 0 0 1 | 18037 |
| Mask 31<br>If ≥2 cardinal cells bad (top, right, and bottom)<br>⇒ exclude all inner corners | 1 0 0 0 1<br>1 1 X 0 1<br>1 0 0 0 1 | 18033 |
| Mask 32<br>If ≥2 cardinal cells bad (left, right, bottom)<br>⇒ exclude all inner corners | 1 0 1 0 1<br>1 0 X 0 1<br>1 0 0 0 1 | 17973 |
| Mask 33<br>Eight outer middle cell bad AND bottom cardinal cell bad<br>⇒ exclude bottom inner corners and outer middles | 1 1 1 1 1<br>0 1 X 1 0<br>1 0 0 0 1 | 17759 |
| Mask 34<br>Either outer middle bad AND bottom cardinal cell bad<br>⇒ exclude all inner corners and outer middles | 1 0 1 0 1<br>0 1 X 1 0<br>1 0 0 0 1 | 17749 |
| Mask 35<br>Either outer middle cell bad AND ≥2 cardinal cells bad (top and bottom)<br>⇒ exclude all inner corners and outer middles | 1 0 0 0 1<br>0 1 X 1 0<br>1 0 0 0 1 | 17745 |

FIG. 5F

| | |
|---|---|
| X | = Defective Center Cell |
| | = Good Neighboring Cell |
| ▓ | = Defective/Excluded Neighboring Cell |
| ░ | = Defective/Excluded Cardinal cell |

| Rule Description for Mask | Mask Configuration | Decimal Equivalent |
|---|---|---|
| Mask 36<br>Either outer middle cell bad AND ≥2 cardinal cells bad (left and bottom)<br>⇒ exclude all inner corners and outer middles | | 17685 |
| Mask 37<br>Either outer middle cell bad AND ≥2 cardinal cells bad (top, left, and bottom)<br>⇒ exclude all inner corners and outer middles | | 17681 |
| Mask 38<br>Either outer middle cell bad AND ≥2 cardinal cells bad (right and bottom)<br>⇒ exclude all inner corners and outer middles | | 17493 |
| Mask 39<br>Either outer middle cell bad AND ≥2 cardinal cells bad (left, right, and bottom)<br>⇒ exclude all inner corners and outer middles | | 17489 |
| Mask 40<br>Either outer middle cell bad AND ≥2 cardinal cells bad (left, right, and bottom)<br>⇒ exclude all inner corners and outer middles | | 17429 |
| Mask 41<br>Either outer middle cell bad AND all cardinal cells bad<br>⇒ exclude all inner corners and outer middles | | 17425 |
| Mask 42<br>All cardinal cells, inner corners, both outer middle, AND top left outer corner bad ⇒ use all available good cells | | 17424 |

FIG. 5G

| X | = Defective Center Cell |
| | = Good Neighboring Cell |
| (dark) | = Defective/Excluded Neighboring Cell |
| (light shaded) | = Defective/Excluded Cardinal cell |

| Rule Description for Mask | Mask Configuration | Decimal Equivalent |
|---|---|---|
| Mask 43<br>All cardinal cells, inner corners, both outer middle, AND top right outer corner bad ⇒ use all available good cells | | 17409 |
| Mask 44<br>All cardinal cells, inner corners, both outer middle, AND both top outer corners bad ⇒ use all available good cells | | 17408 |
| Mask 45<br>All cardinal cells, inner corners, both outer middle, AND bottom left outer corner bad ⇒ use all available good cells | | 16401 |
| Mask 46<br>All cardinal cells, inner corners, both outer middle, AND both left outer corners bad ⇒ use all available good cells | | 16400 |
| Mask 47<br>All cardinal cells, inner corners, both outer middle, AND bottom left and top right outer corners bad ⇒ use all available good cells | | 16385 |
| Mask 48<br>All cardinal cells, inner corners, both outer middle, AND both left outer corners, AND top right outer corner bad ⇒ use all available good cells | | 16384 |
| Mask 49<br>Any outer corner bad ⇒ exclude all outer corners | | 15214 |

FIG. 5H

| | |
|---|---|
| X | = Defective Center Cell |
| | = Good Neighboring Cell |
| ▓ | = Defective/Excluded Neighboring Cell |
| ░ | = Defective/Excluded Cardinal cell |

<u>Rule Description for Mask</u>    <u>Mask Configuration</u>    Decimal <u>Equivalent</u>

Mask 50
Any outer corner bad AND top cardinal cell bad
⇒ exclude top inner corners and all outer corners

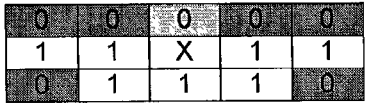

15200

Mask 51
Any outer corner(s) and either outer middle cells bad
⇒ exclude outer columns

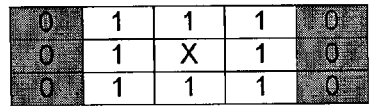

14670

Mask 52
Any outer corner AND either outer middle AND top cardinal cell bad
⇒ exclude top inner corners and outer columns

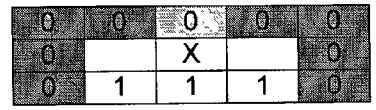

14336

Mask 53
Any outer corner AND left cardinal cell bad
⇒ exclude left inner corners and all outer corners

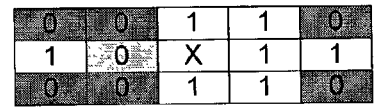

13100

Mask 54
Any outer corner AND either outer middle bad AND left cardinal cell bad
⇒ exclude left inner corners and outer columns

12556

Mask 55
All 4 cardinal cells bad AND any inner corners good
⇒ use only inner corners (exclude outer columns)

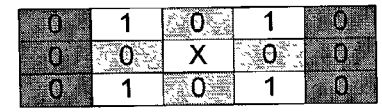

10250

Mask 56
All 4 cardinal cells bad AND any inner corners good ⇒ use all good inner corner cells (exclude outer columns)

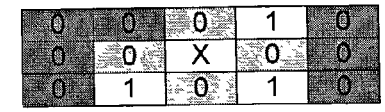

| | |
|---|---|
| X | = Defective Center Cell |
| | = Good Neighboring Cell |
| ▓ | = Defective/Excluded Neighboring Cell |
| ▒ | = Defective/Excluded Cardinal cell |

| Rule Description for Mask | Mask Configuration | Decimal Equivalent |
|---|---|---|

Mask 57
All 4 cardinal cells bad AND any inner corners good ⇒
use all good inner corner cells (exclude outer columns)

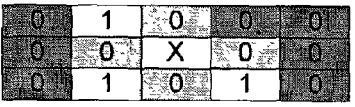 10242

Mask 58
All 4 cardinal cells bad AND any inner corners good ⇒
use all good inner corner cells (exclude outer columns)

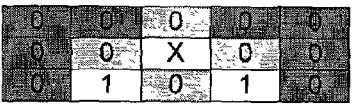 10240

Mask 59
All 4 cardinal cells bad AND any inner corners good ⇒
use all good inner corner cells (exclude outer columns)

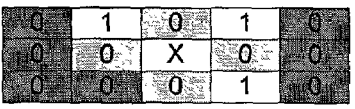 8202

Mask 60
All 4 cardinal cells bad AND any inner corners good ⇒
use all good inner corner cells (exclude outer columns)

 8200

Mask 61
All 4 cardinal cells bad AND any inner corners good ⇒
use all good inner corner cells (exclude outer columns)

 8194

Mask 62
All 4 cardinal cells bad AND any inner corners good ⇒
use all good inner corner cells (exclude outer columns)

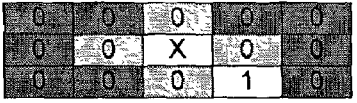 8192

Mask 63
Any outer corner AND right cardinal cell bad
⇒ exclude right inner corners and all outer corners

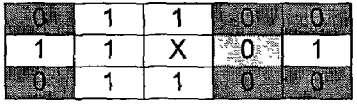 6758

FIG. 5J

| | |
|---|---|
| X | = Defective Center Cell |
| | = Good Neighboring Cell |
| ▓ | = Defective/Excluded Neighboring Cell |
| ▒ | = Defective/Excluded Cardinal cell |

| Rule Description for Mask | Mask Configuration | Decimal Equivalent |
|---|---|---|
| Mask 64<br>Any outer corner AND either outer middle AND right cardinal cell bad<br>⇒ exclude right inner corners and outer columns | 0 1 1 0 0<br>0 1 X 0 0<br>0 1 1 0 0 | 6214 |
| Mask 65<br>Any outer corner and any inner corner bad<br>⇒ exclude all inner corners and all outer corners | 0 0 1 0 0<br>1 1 X 1 1<br>0 0 1 0 0 | 4964 |
| Mask 66<br>Any outer corner AND top cardinal cell AND either bottom inner corner bad<br>⇒ exclude all inner corners and all outer corners | 0 0 0 0 0<br>1 1 X 1 1<br>0 0 1 0 0 | 4960 |
| Mask 67<br>Any outer corner AND left cardinal cell AND either right inner corner bad<br>⇒ exclude all inner corners and all outer corners | 0 0 1 0 0<br>1 0 X 1 1<br>0 0 1 0 0 | 4900 |
| Mask 68<br>Any outer corner bad AND ≥2 cardinal cells (top, left) bad<br>⇒ exclude all inner corners and all outer corners | 0 0 0 0 0<br>1 0 X 1 1<br>0 0 1 0 0 | 4896 |
| Mask 69<br>Any outer corner AND right cardinal cell AND either left inner corner bad<br>⇒ exclude all inner corners and all outer corners | 0 0 1 0 0<br>1 1 X 0 1<br>0 0 1 0 0 | 4708 |
| Mask 70<br>Any outer corner bad AND ≥2 cardinal cells (top, right) bad<br>⇒ exclude all inner corners and all outer corners | 0 0 0 0 0<br>1 1 X 0 1<br>0 0 1 0 0 | 4704 |

FIG. 5K

| | |
|---|---|
| X | = Defective Center Cell |
| | = Good Neighboring Cell |
| ▓ | = Defective/Excluded Neighboring Cell |
| ▒ | = Defective/Excluded Cardinal cell |

| Rule Description for Mask | Mask Configuration | Decimal Equivalent |
|---|---|---|
| Mask 71<br>Any outer corner bad AND ≥2 cardinal cells (left, right) bad<br>⇒ exclude all inner corners and all outer corners |  | 4644 |
| Mask 72<br>Any outer corner bad AND<br>≥2 cardinal cells (top, left, right) bad<br>⇒ exclude all inner corners and all outer corners |  | 4640 |
| Mask 73<br>Any outer corner AND any inner corner AND either outer middle bad ⇒ use only Cardinal cells |  | 4420 |
| Mask 74<br>Any outer corner AND either outer middle<br>AND top cardinal AND either bottom inner corner bad<br>⇒ exclude all inner corners and outer columns |  | 4416 |
| Mask 75<br>Any outer corner AND either outer middle<br>AND left cardinal AND either right inner corner bad<br>⇒ exclude all inner corners and outer columns | 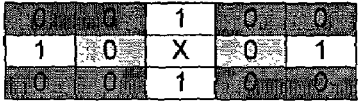 | 4356 |
| Mask 76<br>Any outer corner AND either outer middle<br>AND ≥2 cardinal cells bad<br>⇒ exclude all inner corners and outer columns |  | 4352 |
| Mask 77<br>Any outer corner AND either outer middle<br>AND right cardinal AND either left inner corner bad<br>⇒ exclude all inner corners and outer columns | 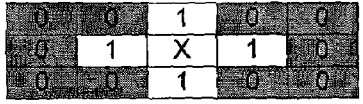 | 4164 |

FIG. 5L

| | |
|---|---|
| X | = Defective Center Cell |
| | = Good Neighboring Cell |
| ▓ | = Defective/Excluded Neighboring Cell |
| ▒ | = Defective/Excluded Cardinal cell |

| Rule Description for Mask | Mask Configuration | Decimal Equivalent |
|---|---|---|
| Mask 78 <br> Any outer corner AND either outer middle AND ≥2 cardinal cells bad ⇒ exclude all inner corners and outer columns | 0 0 0 0 0 <br> 0 1 X 0 0 <br> 0 0 1 0 0 | 4160 |
| Mask 79 <br> Any outer corner AND either outer middle AND ≥2 cardinal cells bad ⇒ exclude all inner corners and outer columns | 0 0 1 0 0 <br> 0 0 X 0 0 <br> 0 0 1 0 0 | 4100 |
| Mask 80 <br> Any outer corner AND either outer middle AND ≥2 cardinal cells bad ⇒ exclude all inner corners and outer columns | 0 0 0 0 0 <br> 0 0 X 0 0 <br> 0 0 1 0 0 | 4096 |
| Mask 81 <br> All 4 cardinal cells bad AND any inner corners good ⇒ use all good inner corner cells (exclude outer columns) | 0 1 0 1 0 <br> 0 0 X 0 0 <br> 0 1 0 0 0 | 2058 |
| Mask 82 <br> All 4 cardinal cells bad AND any inner corners good ⇒ use all good inner corners (exclude outer columns) | 0 0 0 1 0 <br> 0 0 X 0 0 <br> 0 1 0 0 0 | 2056 |
| Mask 83 <br> All 4 cardinal cells bad AND any inner corners good ⇒ use all good inner corners (exclude outer columns) | 0 1 0 0 0 <br> 0 0 X 0 0 <br> 0 1 0 0 0 | 2050 |
| Mask 84 <br> All 4 cardinal cells bad AND any inner corners good ⇒ use all good inner corners (exclude outer columns) | 0 0 0 0 0 <br> 0 0 X 0 0 <br> 0 1 0 0 0 | 2048 |

FIG. 5M

| | |
|---|---|
| X | = Defective Center Cell |
| | = Good Neighboring Cell |
| ▓ | = Defective/Excluded Neighboring Cell |
| ░ | = Defective/Excluded Cardinal cell |

| Rule Description for Mask | Mask Configuration | Decimal Equivalent |
|---|---|---|
| Mask 85 <br> All cardinal cells AND all inner corners AND both outer middles bad <br> ⇒ use all good outer corners | 1 0 0 0 1 / 0 0 X 0 0 / 1 0 0 0 0 | 1041 |
| Mask 86 <br> All cardinal cells AND all inner corners AND both outer middles bad <br> ⇒ use all good outer corners | 0 0 0 0 1 / 0 0 X 0 0 / 1 0 0 0 0 | 1040 |
| Mask 87 <br> All cardinal cells AND all inner corners AND both outer middles bad <br> ⇒ use all good outer corners | 1 0 0 0 0 / 0 0 X 0 0 / 1 0 0 0 0 | 1025 |
| Mask 88 <br> All cardinal cells AND all inner corners AND both outer middles bad <br> ⇒ use all good outer corners | 0 0 0 0 0 / 0 0 X 0 0 / 1 0 0 0 0 | 1024 |
| Mask 89 <br> Any outer corner AND bottom cardinal cell bad <br> ⇒ exclude bottom inner AND all outer corners | 0 1 1 1 0 / 1 1 X 1 1 / 0 0 0 0 0 | 878 |
| Mask 90 <br> Any outer corner AND bottom cardinal cell AND either top inner corner bad <br> ⇒ exclude all inner corners and all outer corners | 0 0 1 0 0 / 1 1 X 1 1 / 0 0 0 0 0 | 868 |
| Mask 91 <br> Any outer corner AND ≥2 cardinal cells (top, bottom) bad ⇒ exclude all inner corners and all outer corners | 0 0 0 0 0 / 1 1 X 1 1 / 0 0 0 0 0 | 864 |

FIG. 5N

| | |
|---|---|
| X | = Defective Center Cell |
| | = Good Neighboring Cell |
| ▓ | = Defective/Excluded Neighboring Cell |
| ▒ | = Defective/Excluded Cardinal cell |

| Rule Description for Mask | Mask Configuration | Decimal Equivalent |
|---|---|---|
| Mask 92 <br> Any outer corner AND ≥2 cardinal cells (left, bottom) bad ⇒ exclude all inner corners and all outer corners | 0 0 1 0 0 <br> 1 0 X 1 1 <br> 0 0 0 0 0 | 804 |
| Mask 93 <br> Any outer corner AND ≥2 cardinal cells (top, left, bottom) bad ⇒ exclude all inner corners and all outer corners | 0 0 0 0 0 <br> 1 0 X 1 1 <br> 0 0 0 0 0 | 800 |
| Mask 94 <br> Any outer corner AND ≥2 cardinal cells (right, bottom) bad ⇒ exclude all inner corners and all outer corners | 0 0 1 0 0 <br> 1 1 X 0 1 <br> 0 0 0 0 0 | 612 |
| Mask 95 <br> Any outer corner AND ≥2 cardinal cells (top, right, bottom) bad ⇒ exclude all inner corners and all outer corners | 0 0 0 0 0 <br> 1 1 X 0 1 <br> 0 0 0 0 0 | 608 |
| Mask 96 <br> Any outer corner AND ≥2 cardinal cells (left, right, bottom) bad ⇒ exclude all inner corners and all outer corners | 0 0 1 0 0 <br> 1 0 X 0 1 <br> 0 0 0 0 0 | 548 |
| Mask 97 <br> All cardinal cells AND all inner corners bad ⇒ use any good outer middle (exclude outer corners) | 0 0 0 0 0 <br> 1 0 X 0 1 <br> 0 0 0 0 0 | 544 |
| Mask 98 <br> All cardinal cells AND all inner corners bad ⇒ use any good outer middle (exclude outer corners) | 0 0 0 0 0 <br> 0 0 X 0 1 <br> 0 0 0 0 0 | 512 |

FIG. 5O

| | |
|---|---|
| X | = Defective Center Cell |
| | = Good Neighboring Cell |
| ▓ | = Defective/Excluded Neighboring Cell |
| ░ | = Defective/Excluded Cardinal cell |

| Rule Description for Mask | Mask Configuration | Decimal Equivalent |
|---|---|---|

Mask 99
Any outer corner AND either outer middle AND bottom
cardinal cell bad
⇒ exclude bottom inner corners and outer columns

| 0 | 1 | 1 | 1 | 0 |
|---|---|---|---|---|
| 0 | 1 | X | 1 | 0 |
| 0 | 0 | 0 | 0 | 0 |

334

Mask 100
Any outer corner AND either outer middle AND bottom
cardinal cell AND either top inner corner bad
⇒ exclude all inner corners and outer columns

| 0 | 0 | 1 | 0 | 0 |
|---|---|---|---|---|
| 0 | 1 | X | 1 | 0 |
| 0 | 0 | 0 | 0 | 0 |

324

Mask 101
Any outer corner AND either outer middle
AND ≥2 cardinal cells bad
⇒ exclude all inner corners and outer columns

| 0 | 0 | 0 | 0 | 0 |
|---|---|---|---|---|
| 0 | 1 | X | 1 | 0 |
| 0 | 0 | 0 | 0 | 0 |

320

Mask 102
Any outer corner AND either outer middle
AND ≥2 cardinal cells bad
⇒ exclude all inner corners and outer columns

| 0 | 0 | 1 | 0 | 0 |
|---|---|---|---|---|
| 0 | 0 | X | 1 | 0 |
| 0 | 0 | 0 | 0 | 0 |

260

Mask 103
Any outer corner AND either outer middle
AND ≥2 cardinal cells bad
⇒ exclude all inner corners and outer columns

| 0 | 0 | 0 | 0 | 0 |
|---|---|---|---|---|
| 0 | 0 | X | 1 | 0 |
| 0 | 0 | 0 | 0 | 0 |

256

Mask 104
Any outer corner AND either outer middle
AND ≥2 cardinal cells bad
⇒ exclude all inner corners and outer columns

| 0 | 0 | 1 | 0 | 0 |
|---|---|---|---|---|
| 0 | 1 | X | 0 | 0 |
| 0 | 0 | 0 | 0 | 0 |

68

Mask 105
Any outer corner AND either outer middle
AND ≥2 cardinal cells bad
⇒ exclude all inner corners and outer columns

| 0 | 0 | 0 | 0 | 0 |
|---|---|---|---|---|
| 0 | 1 | X | 0 | 0 |
| 0 | 0 | 0 | 0 | 0 |

| | |
|---|---|
| X | = Defective Center Cell |
| | = Good Neighboring Cell |
| ▨ | = Defective/Excluded Neighboring Cell |
| ▨ | = Defective/Excluded Cardinal cell |

| Rule Description for Mask | Mask Configuration | Decimal Equivalent |
|---|---|---|

Mask 106
All cardinal cells AND all inner corners bad
⇒ use any good outer middle (exclude outer corners)

32

Mask 107
All cardinal cells AND all inner corners
AND both outer middles bad
⇒ use all good outer corners

17

Mask 108
All cardinal cells AND all inner corners
AND both outer middles bad
⇒ use all good outer corners

16

Mask 109
All 4 cardinal cells bad AND any inner corners good
⇒ use all good inner corner cells
(exclude outer columns)

10

Mask 110
All 4 cardinal cells bad AND any inner corners good
⇒ use all good inner corner cells
(exclude outer columns)

8

Mask 111
Any outer corner bad AND either left outer middle
or right outer middle AND 2 or more cardinal cells bad
⇒ exclude all inner corners and outer columns

4

Mask 112
All 4 cardinal cells bad AND any inner corners good
⇒use all good inner corner cells
(exclude outer columns)

2

| | |
|---|---|
| X | = Defective Center Cell |
| | = Good Neighboring Cell |
| ▓ | = Defective/Excluded Neighboring Cell |
| ░ | = Defective/Excluded Cardinal cell |

Rule Description for Mask      Mask Configuration      Decimal Equivalent

Mask 113
All cardinal cells AND all inner corners
AND both outer middles bad
⇒ use all good outer corners

1

| Top Left Outer Corner | Top Left Inner Corner | Top Cardinal Cell | Top Right Inner Corner | Top Right Outer Corner |
|---|---|---|---|---|
| Left Outer Middle Cell | Left Cardinal Cell | Center Pixel | Right Cardinal Cell | Right Outer Middle Cell |
| Bottom Left Outer Corner | Bottom Left Inner Corner | Bottom Cardinal Cell | Bottom Right Inner Corner | Bottom Right Outer Corner |

FIG. 6

| 225 | 225 | 170 | 95 | 195 |
|-----|-----|-----|----|-----|
| 225 | 170 | x   | 95 | 195 |
| 170 | 170 | 95  | 95 | 195 |

FIG. 7A. Sample image with asymmetric field (0-255 grayscale)

| 225 | --  | --  | 95 | 195 |
|-----|-----|-----|----|-----|
| 225 | --  | x   | 95 | 195 |
| 170 | 170 | 95  | 95 | 195 |

FIG. 7B. Example FPA condition with 3 additional defective cells

| 1 | 0 | 0 | 0 | 1 |
|---|---|---|---|---|
| 1 | 0 | x | 1 | 1 |
| 1 | 0 | 1 | 0 | 1 |

FIG. 7C. Asymmetric replacement mask

| -0.03325 | -0.3325 | 0.95 | -0.3325 | -0.03325 |
|----------|---------|------|---------|----------|
| 0.09975  | 0.95    |      | 0.95    | 0.09975  |
| -0.03325 | -0.3325 | 0.95 | -0.3325 | -0.03325 |

FIG. 7D. Weighting coefficients

| -0.03325 | 0 | 0    | 0    | -0.03325 |
|----------|---|------|------|----------|
| 0.09975  | 0 |      | 0.95 | 0.09975  |
| -0.03325 | 0 | 0.95 | 0    | -0.03325 |

FIG. 7E. Product of weighting coefficients and mask

| 225 | --  | --     | 95 | 195 |
|-----|-----|--------|----|-----|
| 225 | --  | 99.819 | 95 | 195 |
| 170 | 170 | 95     | 95 | 195 |

FIG. 7F. Resulting center pixel value

| 1 | 2 | 3 | 4 | 5 |
|---|---|---|---|---|
| 6 | 7 | 8 | 9 | 10 |
| 11 | 12 | 13 | 14 | 15 |

FIG. 9A

| -.05 | -.5 | 1 | -.5 | -.05 |
|---|---|---|---|---|
| .1 | 1 | XXX | 1 | .1 |
| -.05 | -.5 | 1 | -.5 | -.05 |

FIG. 9B

| Array Size (and RMS error) | Weighting Coefficients |
|---|---|

Cardinal
(78.69)

| 0 | 1 | 0 |
|---|---|---|
| 1 | 0 | 1 |
| 0 | 1 | 0 |

3 x 3
(55.65)

| -0.4843 | 1 | -0.4843 |
|---|---|---|
| 1 | 0 | 1 |
| -0.4843 | 1 | -0.4843 |

3 x 5
(55.38)

| 0.0001 | -0.453 | 1 | -0.453 | 0.0001 |
|---|---|---|---|---|
| -0.0624 | 1 | 0 | 1 | -0.0624 |
| 0.0001 | -0.453 | 1 | -0.453 | 0.0001 |

5 x 3
(54.66)

| 0.0001 | -0.0311 | 0.0001 |
|---|---|---|
| -0.4687 | 1 | -0.4687 |
| 1 | 0 | 1 |
| -0.4687 | 1 | -0.4687 |
| 0.0001 | -0.0311 | 0.0001 |

5 x 5
(53.77)

| 0.0157 | 0.0001 | -0.078 | 0.0001 | 0.0157 |
|---|---|---|---|---|
| 0.0001 | -0.4218 | 1 | -0.4218 | 0.0001 |
| -0.078 | 1 | 0 | 1 | -0.078 |
| 0.0001 | -0.4218 | 1 | -0.4218 | 0.0001 |
| 0.0157 | 0.0001 | -0.078 | 0.0001 | 0.0157 |

5 x 7
(53.90)

| 0.0001 | 0.0157 | 0.0001 | -0.078 | 0.0001 | 0.0157 | 0.0001 |
|---|---|---|---|---|---|---|
| 0.0001 | 0.0001 | -0.4218 | 1 | -0.4218 | 0.0001 | 0.0001 |
| 0.0001 | -0.078 | 1 | 0 | 1 | -0.078 | 0.0001 |
| 0.0001 | 0.0001 | -0.4218 | 1 | -0.4218 | 0.0001 | 0.0001 |
| 0.0001 | 0.0157 | 0.0001 | -0.078 | 0.0001 | 0.0157 | 0.0001 |

FIG. 11A

Array Size (and RMS error)     Weighting Coefficients 7 x 5
(53.65)

| 0.0001 | 0.0001 | 0.0157 | 0.0001 | 0.0001 |
|---|---|---|---|---|
| 0.0314 | 0.0001 | -0.0936 | 0.0001 | 0.0314 |
| 0.0001 | -0.453 | 1 | -0.453 | 0.0001 |
| -0.0936 | 1 | 0 | 1 | -0.0936 |
| 0.0001 | -0.453 | 1 | -0.453 | 0.0001 |
| 0.0314 | 0.0001 | -0.0936 | 0.0001 | 0.0314 |
| 0.0001 | 0.0001 | 0.0157 | 0.0001 | 0.0001 |

7 x 7
(53.92)

| 0.0001 | 0.0001 | 0.0001 | -0.0155 | 0.0001 | 0.0001 | 0.0001 |
|---|---|---|---|---|---|---|
| 0.0001 | 0.0314 | 0.0001 | -0.0624 | 0.0001 | 0.0314 | 0.0001 |
| 0.0001 | 0.0001 | -0.453 | 1 | -0.453 | 0.0001 | 0.0001 |
| -0.0155 | -0.0624 | 1 | 0 | 1 | -0.0624 | -0.0155 |
| 0.0001 | 0.0001 | -0.453 | 1 | -0.453 | 0.0001 | 0.0001 |
| 0.0001 | 0.0314 | 0.0001 | -0.0624 | 0.0001 | 0.0314 | 0.0001 |
| 0.0001 | 0.0001 | 0.0001 | -0.0155 | 0.0001 | 0.0001 | 0.0001 |

FIG. 11B

METHOD AND APPARATUS FOR IMAGE PROCESSING USING WEIGHTED DEFECTIVE PIXEL REPLACEMENT

BACKGROUND

1. Field of the Invention

The present invention relates to image processing. More particularly, the present invention relates to determining replacement pixel values for defective sensing elements of a detector array.

2. Background Information

Focal plane arrays (FPAs) are detector arrays that can be used in infrared (IR) imaging systems, such as forward looking infrared (FLIR) camera systems, and are the "eyes" of an IR sensor. Third-generation (staring) FPAs comprise a plurality of sensing elements for detecting radiation arranged in a two-dimensional configuration. Second-generation (scanning) FPAs comprise a plurality of sensing elements arranged in a one-dimensional configuration. As used herein, a one-dimensional array is intended to include a quasi-one-dimensional array known to those skilled in the art, and such as described, for example, in U.S. patent application Ser. No. 09/840,920, now U.S. Pat. No. 6,901,173, entitled "Scene-based non-uniformity correction for detector arrays", the entire contents of which are incorporated herein by reference.

FPAs can have defective sensing elements. A defective sensing element in a scanning FPA yields an entire row of defective pixels (also called a "channel" outage) in a collected image. Defective sensing elements in a staring FPA do not result in an entire defective row of pixels of an image, but nevertheless result in a loss of image information and a reduction in the aesthetic quality of imagery obtained if not corrected.

Conventional approaches are known for determining replacement pixel values associated with defective sensing elements of an FPA. Such approaches are typically known as dead-pixel replacement or dead-cell replacement. For example, U.S. Pat. No. 6,359,681, entitled "Combined Laser/FLIR Optics System", describes an approach for dead-cell replacement wherein a list of "dead" cells (i.e., detector elements that do not properly respond) is maintained, and wherein a pixel value corresponding to each "dead" cell is replaced with an approximation value. In the approach described therein, the approximation value is derived by averaging the values of the pixels which border the pixel corresponding to the "dead" cell, and only neighboring pixels that correspond to properly functioning detector elements are used for the purpose of deriving an approximation value. In other words, the replacement pixel according to this approach is an average of pixel values corresponding to properly functioning detector elements in a 3×3 region surrounding the defective detector element (in terms of the number of pixels).

In another conventional approach for dead-cell replacement, the pixel values of cardinal cells adjacent to a given dead (i.e., defective) cell are averaged to determine a replacement pixel value for the defective cell. The cardinal cells are those immediately adjacent cells that are positioned directly above and below the defective cell and directly to the left of and to the right of the defective cell.

SUMMARY OF THE INVENTION

According to an exemplary aspect of the present invention, there is provided an apparatus for processing image data. The apparatus comprises a memory and a processing unit coupled to the memory. The processing unit is configured to obtain a set of weighting coefficients to be used in calculating replacement pixel values associated with defective sensing elements of a detector array, the set of weighting coefficients including at least one negative weighting coefficient. The processing unit is also configured to obtain information identifying one or more defective sensing elements of the detector array and to receive image data of an image from the detector array. The processing unit is further configured to calculate a weighted average of pixel values from sensing elements adjacent to a first defective sensing element of the detector array using at least some of the weighting coefficients. The processing unit is also configured to assign the weighted average to be a replacement pixel value for the first defective sensing element.

According to another exemplary aspect of the present invention, there is provided a method of processing image data. The method comprises obtaining a set of weighting coefficients to be used in calculating replacement pixel values associated with defective sensing elements of a detector array, the set of weighting coefficients including at least one negative weighting coefficient. The method also comprises obtaining information identifying one or more defective sensing elements of the detector array and receiving image data of an image from the detector array. The method further comprises calculating a weighted average of pixel values from sensing elements adjacent to a first defective sensing element of the detector array using at least some of the weighting coefficients. The method also comprises assigning the weighted average to be a replacement pixel value for the first defective sensing element.

BRIEF DESCRIPTION OF THE FIGURES

FIGS. 3A-3D illustrate exemplary quantities used in calculating a replacement pixel value for a defective sensing element in one example according to the present invention.

FIGS. 4A-4G illustrate exemplary quantities used in calculating a replacement pixel value for a defective sensing element in one example according to the present invention.

FIGS. 5A-5Q illustrate exemplary replacement masks for a 3×5 replacement kernel according to an exemplary aspect of the present invention.

FIG. 6 illustrates a legend for terminology relating to cell locations according to the present invention.

FIGS. 7A-7F illustrate exemplary quantities used in calculating a replacement pixel value for a defective sensing element in one example according to the present invention.

FIG. 9A illustrates a legend of bit positions according to the present invention.

FIG. 9B illustrates exemplary starting values for weighting coefficients for an exemplary 3×5 kernel according to the present invention.

FIGS. 11A and 11B illustrate exemplary kernels of weighting coefficients according to an aspect of the present invention.

DETAILED DESCRIPTION

Figure 1:
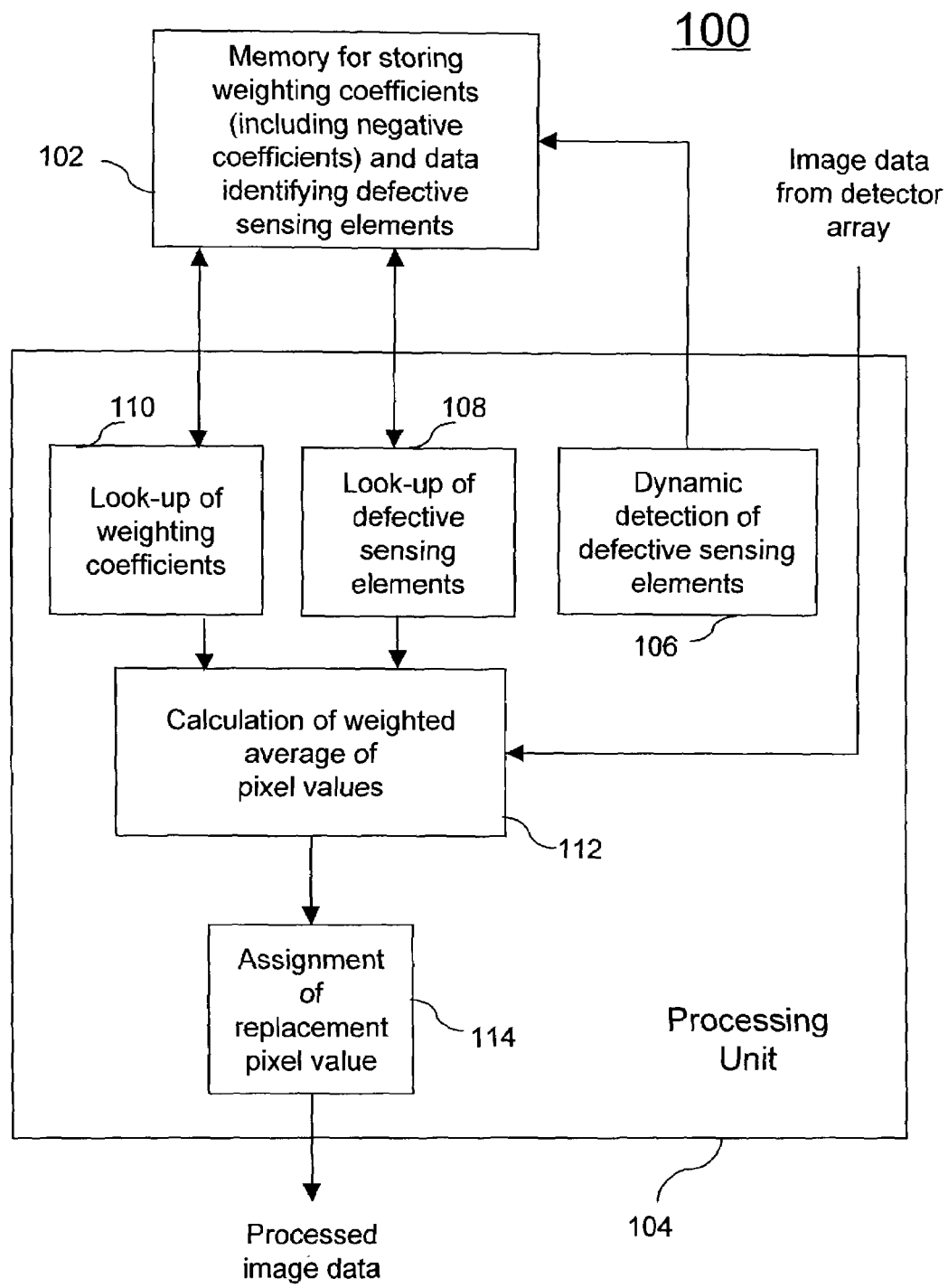
FIG. 1 is a functional block diagram of an image processing system according to an exemplary aspect of the invention.

According to one aspect of the invention there is provided an apparatus for processing image data. FIG. 1 illustrates a functional block diagram of an exemplary apparatus 100 for processing image data according to the present invention. The apparatus 100 comprises a memory 102 and a processing unit 104 coupled to the memory, wherein the processing unit 104 is configured to execute exemplary process steps described below with reference to FIG. 2. In this regard, it will also be appreciated that FIG. 2 illustrates an exemplary method 200 of processing image data according to another aspect of the invention.

Figure 2:
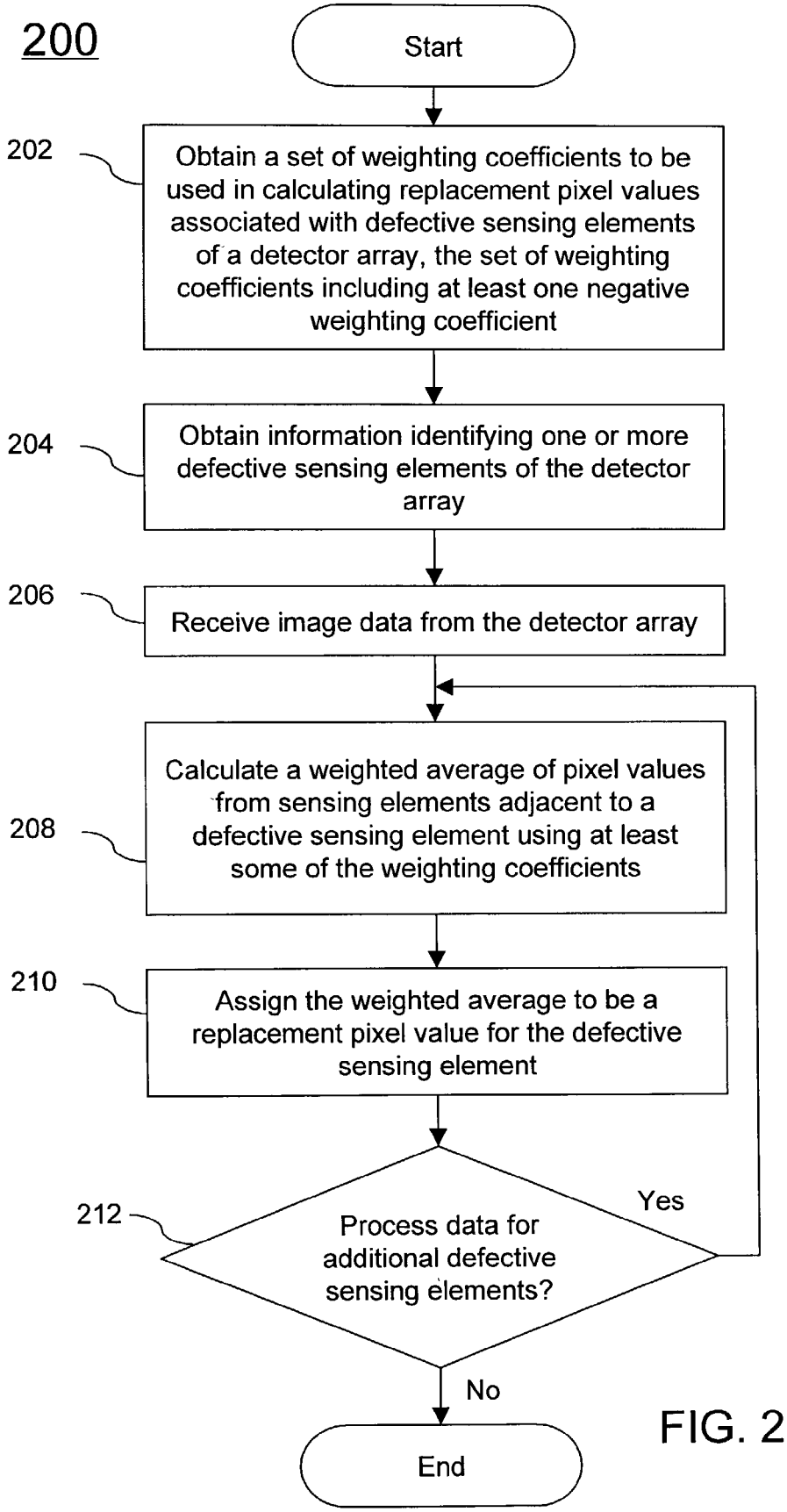
FIG. 2 is a flow diagram of a method of processing image data according to an exemplary aspect of the present invention.

As illustrated in the flow diagram of FIG. 2, the processing unit 104 is configured to obtain a set of weighting coefficients to be used in calculating replacement pixel values associated with defective sensing elements of a detector array, the set of weighting coefficients including at least one negative weighting coefficient (step 202). This step can be viewed as being carried out by functional block 110 within the processing unit 104 shown in FIG. 1. Exemplary approaches for determining a set of weighting coefficients, and a rationale for utilizing at least one negative weighting coefficients in the set of weighting coefficients, will be described with reference to FIGS. 8 and 10.

The processing unit 104 is also configured to obtain information identifying one or more defective sensing elements of the detector array, as shown at step 204 of FIG. 2. This can be accomplished, for example, by looking-up data stored in the memory 102 that identifies defective sensing elements (defective cells), as shown by functional block 108 shown in FIG. 1. The data that identifies the defective sensing elements can be in the form of a list of defective sensing elements, for example. Alternatively, the data that identifies defective sensing elements can also be stored in the form of a flag wherein, for example, values of zero are stored for the gain and offset coefficients associated with each defective sensing element of the detector array. The processing unit can be configured to detect these zero values, thus identifying the associated defective sensing elements as needing replacement pixel values. Conventional use of gain and offset coefficients in conjunction with detector arrays is known to those skilled in the art and does not need to be described further. Also, the memory 102 can be provided as part of a replaceable unit that is combined with the FPA.

Generally, the defective sensing elements are those that fail to meet specifications for response, offset, correctability, and noise, for example. The data that identifies defective sensing elements can have a static component determined by the vendor and supplemented through in-house testing and, optionally, can also have a dynamic component determined using dynamic detection of defective sensing elements, such as illustrated in FIG. 1 by functional block 106, which will be described below. It can be desirable to use in-house testing to supplement the data identifying defective cells to identify additional defective pixels that may have been missed in previous inspections, and it is not uncommon to discover additional artifacts such as row-correlated noise, microphonics, popcorn noise, and intermittent outages.

Defective cells can be determined in a number of ways. For example, the thermal response of each detector element may be compared to an expected response. For example, if the actual response is far greater or far less than expected, the corresponding sensing element is probably not functioning properly. In addition, the detector can be monitored to assess whether the responses of individual sensing elements are steady or appear to flicker. A flickering or jittery response probably indicates that the corresponding sensing element is not properly functioning. Further, the response of a given sensing element can be compared to the mean value obtained from the responses of all of the sensing elements. A response that is substantially different from the mean response probably indicates that the corresponding sensing element is not functioning properly. Also, if the dynamic range of a given sensing element is limited, this probably can mean that the sensing element is not functioning properly. One skilled in the art will understand that this list of criteria is not exclusive, and that other criteria may similarly be used to identify defective sensing elements.

In addition, FPAs can degrade over time, and dynamic detection of defective sensing elements can be provided to identify new dead cells that need to be added to the list of defective sensing elements or that need to be flagged as needing replacement pixel values. This aspect is illustrated by functional block 106 in FIG. 1. Dynamic detection of defective sensing elements (block 106) can be carried out at power-up of a system that includes the apparatus 100. The dynamic detection can be based upon an automated examination of the sensing elements for conditions of low noise, excessive noise, and blinking, for example. Of course, this list of criteria is not intended to be exhaustive, and those skilled in the art will understand that other or additional criteria could be used. The dynamic detection block 106 can update the memory 102 to include additional data identifying additional sensing elements thus determined to be defective. Although the dynamic detection block is illustrated as being within the processing unit 104, this function can be provided as part of a replaceable unit that is combined with the FPA.

The processing unit 104 is also configured to receive image data from the detector array as shown at step 206 of FIG. 2. The image data can be, for example, a frame of infrared (IR) imagery. However, the present invention is not limited to the processing of infrared imagery, and the image data received by the processing unit 104 can correspond to imagery received from any suitable detector array in any desired wavelength range including visible wavelengths and other wavelengths. In addition, the image data can be received for immediate processing of replacement pixel values directly from the detector array, or the image data can first undergo any suitable pre-processing (e.g., filtering, gain and offset correction with or without scene-based non-uniformity correction, etc.) before being processed for replacement pixel values by the processing unit 104.

The processing unit 104 is also configured to calculate a weighted average of pixel values from sensing elements adjacent to a first defective sensing element of the detector array using at least some of the weighting coefficients (step 208, FIG. 2) and assigning the weighted average to be a replacement pixel value for the first defective sensing element (step 210, FIG. 2). These two steps can be viewed as being carried out by functional blocks 112 and 144, respectively, within the processing unit 104 shown in FIG. 1. Determining the weighted average can be carried out by multiplying the weighting coefficients, element-by-element, by the pixel values generated by sensing elements adjacent to the first defective sensing element, adding the resulting values together to generate a weighted sum, and then dividing the weighted sum by the sum total of the weighting coefficients used in the calculation. In this aspect of the invention, it is contemplated that if there any additional defective pixels adjacent to the central defective sensing element, their pixel values can be ignored for purposes of calculating a weighted average, and the corresponding weighting coefficients would, therefore, not be used. An alternative approach for addressing additional defective sensing elements adjacent to a central defective sensing element based upon symmetry considerations will be discussed below.

Having determined a replacement pixel value for the first defective sensing element, the processing unit 104 can determine whether replacement values should be determined for additional defective sensing elements, as shown at step 212 of FIG. 2. If so, the processing unit 104 carry out steps 208 and 210 again for other defective sensing elements of the detector array for the image data, e.g., for the present frame of image data. Additional image data, e.g., additional frames of image data, can similarly be processed by the processing unit 104 by returning to step 206 and repeating the above-described steps.

An example of the above-described exemplary approach for calculating a replacement pixel value according to the present invention will now be discussed by way of a hypothetical example with reference to FIGS. 3A-3D. The example is described assuming a two-dimensional detector array for convenience; however, the concepts are applicable to a one-dimensional array as well, with minor modifications that will be described later. FIG. 3A shows hypothetical pixel values for a portion of an image 3 pixels by 5 pixels in size centered about a pixel that corresponds to a defective sensing element of a two-dimensional detector array. The pixel values are assumed to be 8-bit grayscale quantities with values in the range 0-255. FIG. 3B shows an exemplary 3×5 two-dimensional array of weighting coefficients that has been found to be advantageous for a particular combination of an IR FPA coupled to an IR optical system that has been tested. A description of how these weighting coefficients were obtained will be described below. FIG. 3C shows results of an element-by-element multiplication of the pixel values given in FIG. 3A and the weighting coefficients given in FIG. 3B. In this example, it is assumed that there are no other defective sensing elements in the 3×5 area surrounding the central defective element. However, if any additional defective sensing elements were present in the 3×5 area surrounding the central defective sensing element, their pixel values could be ignored for purposes of calculating a weighted average. Alternatively, a symmetry-based approach can be used to address additional defective sensing elements adjacent to a central defective sensing element, as will be discussed below.

To determine a replacement pixel value for center pixel associated with the defective sensing element in the present example, the values in FIG. 3C are added together, thus forming a weighted sum of the pixel values, and the result is divided by the sum total of the weighting coefficients used (i.e., as a normalization). In this example the weighted sum has a value of 342.418, and the sum total of the weighting coefficients used is 2.537. Dividing the former quantity by the latter quantity gives a replacement pixel value of 135, as shown in FIG. 3D. From a brief inspection of FIG. 3A, one skilled in the art will easily recognize that 135 is an appropriate replacement pixel value for the central pixel by virtue of the symmetry of the field. In this example, the same result of 135 could also be obtained by linear interpolation.

In an exemplary aspect of the invention, the sensing elements adjacent to the first defective sensing element can be located within ±3 units of the first defective pixel in at least one of two directions, wherein a size of one unit in a given direction is equivalent to size of one sensing element of the detector array in that direction. For example, for a two-dimensional detector array, the sensing elements adjacent to the first defective sensing element, whose values are used to calculate a replacement value, can be positioned in a 3×3 area, a 3×5 area, a 5×5 area, a 5×5 area, a 5×7 area, a 7×5 area, or a 7×7 area surrounding the first defective sensing element. For a one-dimensional detector array, the sensing elements adjacent to the first defective sensing element can be located within ±3 units of the first defective sensing element in a lengthwise direction along the detector array, for example. Of course the present invention is not intended to be limited to these examples.

In addition, the set of weighting coefficients can be configured as a two-dimensional array of $(N \cdot M)-1$ weighting coefficients, N and M being integers, and values for N and M can be chosen based upon a size of a blur spot in a plane of the detector array. Stated differently, the size of the two-dimensional array of weighting coefficients in terms of the number of weighting coefficients (e.g., N elements by M elements) can be referred to as a "kernel size", and the kernel size can be chosen based upon a size of a blur spot in a plane of the detector array. The blur spot is associated with the detector array and a corresponding optical system, and arises from imperfections in the optical system and the detector array that cause a point on an object plane to be imaged over an area, rather than a point, on the image plane. It will be recognized that radiation from a point on an object plane will be imaged on the image plane as a function (e.g., a Gaussian function) whose intensity varies with distance on the image plane from the location of the maximum intensity. Thus, it is convenient to view the blur spot as an area spanning 2 standard deviations of the associated function in each of two directions (e.g., an X-direction and a Y-direction). Although the blur spot can be symmetrical such that it has the same intensity distribution in both of these directions, it can also be asymmetrical depending upon the nature of the optical system and the detector array.

Values for N and M can be chosen such that blur spot can encompass an area of at least of $N \cdot M$ units in the plane of the detector array, wherein a size of one unit is equivalent to size of one sensing element of the detector array. In other words, for a two-dimensional detector array, N and M can be chosen such that the blur spot encompasses an area of at least $N \cdot M$ sensing elements. For a one-dimensional detector array it is more appropriate to view the blur spot as encompassing $N \cdot M$ units in the plane of the detector array, because a one-dimensional detector array is not treated as having sensing elements configured in two dimensions. In an exemplary aspect, M and N can be chosen such that M=3 and N=5.

In another exemplary aspect of the invention, the apparatus 100 can process image data and provide replacement pixel values for defective sensing elements in a situation where clustering of defective sensing elements occurs, such that the sensing elements adjacent to the first defective sensing element (whose values are used for calculating a replacement pixel value for the first defective sensing element) include one or more additional defective sensing elements. As noted in the example of FIGS. 3A-3D above, one possibility, if such clustering occurs, is to ignore any additional defective sensing elements such that pixel values for such additional defective sensing elements are not used in the calculation of a replacement pixel value. An alternative symmetry-based approach for addressing clustering will now be described with reference to FIGS. 4A-4G and 5A-5Q.

In this exemplary approach, the processing unit 104 can be configured to determine whether the area surrounding the first defective sensing element includes at least one additional defective sensing element of the detector array. This can be done by looking-up data from a list stored in the memory 102 or by recognizing a flag condition such as described above (e.g., zero offset and gain coefficients for a given sensing element).

The processing unit 104 can then select a set of mask values based upon the determination of whether the area surrounding the first defective sensing element includes at least one additional defective sensing element and apply the mask values in the calculation of the replacement pixel value. A given set of mask values can be referred to as a replacement mask. The mask values determine which ones of the pixel values of non-defective sensing elements adjacent to the first defective sensing element contribute to the calculation of the replacement pixel value. For example, applying the mask values can prevent a pixel value of a first non-defective sensing element adjacent to the first defective sensing element from contributing to the calculation of the replacement pixel value (e.g., by multiplying the mask values element-by-element with the corresponding pixel values). Further, the set of mask values can be configured such that a position of the first non-defective sensing element whose pixel value is excluded is based upon a position(s) of the additional defective sensing element(s). These aspects will be discussed in more detail with reference to a hypothetical example illustrated in FIGS. 4A-4G for a 3×5 replacement mask configuration.

FIG. 4A illustrates a portion of hypothetical sample image data 3×5 pixels in size centered about a center pixel that corresponds to a first defective sensing element. FIG. 4B illustrates an exemplary FPA condition for the image data assuming that two additional sensing elements (denoted by "--") are defective (i.e., the upper left outer corner and the bottom right inner corner). According to the present invention, an exemplary replacement mask in this instance can be selected, in view of symmetry considerations, that excludes all of the inner corners and all of the outer corners from contributing to the replacement pixel value, given that one of the inner corner cells and one of the outer corner cells are defective. Such a replacement mask is shown in FIG. 4C, which has zeros at positions corresponding to the inner and outer corners in this 3×5 example. Exemplary considerations relating to the construction and utilization of replacement masks will be discussed below. FIG. 4D shows an exemplary 3×5 two-dimensional array of weighting coefficients that has been found to be advantageous for a particular combination of an IR FPA coupled to an IR optical system that has been tested. FIG. 4E shows results of an element-by-element multiplication of the weighting coefficients given in FIG. 4D and the mask values given in the replacement mask shown in FIG. 4C. FIG. 4F shows results of an element-by-element multiplication of the values given in FIG. 4E and the pixel values given in FIG. 4B.

To determine a replacement pixel value for center pixel associated with the first defective sensing element in the this example, the values in FIG. 4F are added together, thus forming a weighted sum of the pixel values, and the result is divided by the sum total of the weighting coefficients used (i.e., as a normalization). In this example the weighted sum has a value of 539.93, and the sum total of the weighting coefficients used is 4.00. Dividing the former quantity by the latter quantity gives a replacement pixel value of 135, as shown in FIG. 4G. For comparison purposes, it can be noted that if a simple average of the seven properly functioning cells in the central 3×3 region were used, the replacement value would be approximately 143.6—a 6.3% error. If a simple average of the cardinal cells were used, the replacement pixel value would also be 135 in view of the symmetry of the exemplary 3×5 portion of the sample image. In addition, in FIG. 4G, pixel values for the additional defective sensing elements remain designated with a "--". Replacement pixel values for these cells can be calculated in the manner similar just described.

The example described above with regard to FIGS. 3A-3D and 4A-4G were described with reference to a two-dimensional (staring) detector array. However, the present invention is also applicable to image data received from a one-dimensional (scanning) detector array. In this regard data from the one-dimensional detector array can be buffered to a suitable degree such that image data spatially correlated near a defective sensing element of interest can be made available in time to suitably carry out the calculation of replacement pixel value. One modification that can be made is to avoid using any image data that might arise from the defective sensing element itself. In other words, if the detector array is arranged vertically, image data corresponding to horizontally adjacent cardinal pixels need not be used. Such a modification can be carried through the remainder of the teachings provided herein.

Exemplary considerations relating to the size and symmetry configurations of replacement masks and to the relative values and signs (polarities) of the weighting coefficients will now be discussed. It was noted above that the size of a blur spot for a given optical system can provide one basis for choosing a kernel size to be used in dead-cell replacement. Whereas the size of a blur spot can provide one basis for choosing the kernel size of the set of weighting coefficients to be used in calculating replacement pixel values, empirical considerations can play a role as well. For example, in some cases, using a 3×3 kernel size can provide the most accurate calculation for a configuration wherein a defective sensing element is surrounded by properly functioning detector elements, due to the proximity of these elements with a defective center cell. In other instances where a plurality of cells in an area surrounding a defective cell are also defective, using cells further from the center defective cell can provide a more accurate replacement pixel value. This occurs in cases in which there are multiple defective cells in a 3×3 region of cells surrounding a defective cell of interest. In these instances, a 3×5 kernel can be implemented with advantageous results. A 3×5 kernel is useful in such instances because it can provide the above-noted advantages of improving the accuracy of calculated replacement pixel values for instances where clustering of defective sensing elements occurs and because it can provide replacement pixel values that are nearly as good in other instances as a 3×3 kernel. Moreover, implementing a 3×5 kernel does not require the computational power of implementing a 5×5 kernel, and using a 3×5 kernel provides a beneficial cost-benefit compromise between accuracy and required system power.

The kernel size to be used in dead-cell replacement calculations can also affect the number configurations of replacements masks for consideration, and symmetry considerations combined with empirical testing can provide a basis for assessing which particular configurations of replacement masks should be utilized. For example, where a 3×5 kernel of 15 cells is used, there are mathematically $2^{15}$ combinations of properly functioning and defective cells. However, dead-cell replacement can be performed only when the center cell is defective. Thus, of the $2^{15}$ combinations of cells, only $2^{14}$ combinations need to be considered. Of the 16384 patterns resulting from these $2^{14}$ combinations, it has been experimentally found that many show an improvement in calculated replacement pixel values using image data two cells away from a center defective cell of interest. Accordingly, in one aspect of the invention, a 3×5 kernel size can be useful.

In one example, 214 applicable combinations of good and bad cells have been experimentally considered for the 3×5 kernel. Of those, an analysis of symmetry considerations has lead to a conclusion that 113 different replacement masks are particularly useful in routine application. For example, outer "columns" of cells affect the calculation of a replacement pixel value of a center defective cell similarly. Likewise, the corners of the inner 3×3 region (inner corners), as well as the middle cells of the outer columns, possess mirror symmetry about a center defective cell and affect the calculated replacement pixel value in a similar manner.

In terms of practical application, an appropriate replacement mask can be dependent upon the configuration of properly functioning and defective sensing elements (good and bad cells) around a first defective sensing element. For example, once a first defective sensing element (cell) is identified, if a cell in a first column (i.e., to the left of a center cell) is defective, removing the corresponding cell in the remote (fifth) column can reduce the error of a calculated replacement pixel value. Further analysis has shown that, if one of the outer corners is defective, ignoring all of the outer corners can yield a much smaller error than using any of the good corners. Such considerations of mirror symmetry can yield a decrease in the number of replacement masks that need to be considered and implemented. Various exemplary rules can be developed in view of such symmetry considerations and in view of experimental testing on these symmetry considerations. For example, if any outer corner cell is defective, all outer corners can be excluded from the calculation of a replacement pixel value in many instances. In addition, if any other cell is defective, all cells in its respective category can be treated likewise (e.g., inner corners can be treated alike, outer corners can be treated alike, outer middles can be treated alike, etc.). Of course, replacements masks according to the present invention are not limited to masks having mirror symmetry or other symmetry (see, e.g., asymmetrical masks 50, 52 and 53 in FIG. 5H).

With regard to another exemplary aspect, a single additional dead cell rather than multiple additional dead cells can be a more likely occurrence in a given region of an FPA. In this case, replacement masks with only one or two zeros corresponding to cells whose pixel values are to be excluded are relatively more likely to be used than replacement masks with a greater number of zeros.

Whereas many of the 113 exemplary replacement masks for the 3×5 kernel take into account symmetry, a small number of replacement masks can be used which provide more accurate results for certain configurations of good and bad cells if cells are not excluded from the dead-cell replacement calculation on the basis of symmetry. In some cases, ignoring only cells on top of the mask, or on one side, can provide better results than deleting all pixels on top, bottom, and both sides.

Figure 5Q:
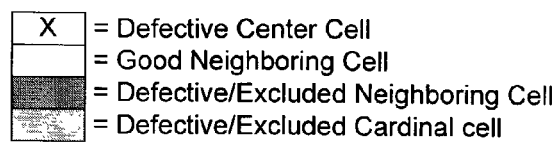

The 113 exemplary replacement masks for the 3×5 kernel are illustrated in FIGS. 5A-5Q along with a description that describes the mask and a decimal equivalent value that identifies the mask. Each decimal equivalent is calculated using the bottom-right pixel as the MSB, leading to the upper-left pixel as the LSB. It should be noted that a dead-cell replacement calculation can be performed when a cell is listed in the dead-cell list stored in the memory 102, or when the cell has gain and offset coefficients set to zero to flag the cell, or when any other suitable flag is used to flag the cell. Thus, in the list of replacement masks illustrated in FIGS. 5A-5Q, the center pixel of the 3×5 kernel will always be zero. The different cells are labeled and analyzed according to the designations set forth in FIG. 6 (e.g., inner corner, outer corner, etc.).

Generally speaking, the exemplary replacement masks and their associated descriptions illustrated in FIGS. 5A-5Q are based upon the following exemplary instruction set. The following exemplary instruction set essentially determines which replacement mask is used for a given configuration of properly functioning and defective (good and bad) cells. In this example the conditional statements are considered in the order given. The patterns of potential dead cells in addition to the center dead cell, and cells that are to be excluded from a calculation of a replacement pixel value based on the presence of additional dead cells and based on symmetry, were determined by considering the actual dead cells in groups. The exemplary instruction is given as follows:

(1) if more than one cardinal cell is dead, then exclude all four inner corners as well;
(2) if any inner corner is dead, then exclude all four inner corners;
(3) if only one cardinal cell is dead, then exclude the two neighboring inner corner cells;
(4) if any outer corner is dead, then set all four dead;
(5) if any outer middle cell is dead, then set both dead;
(6) if four cardinal cells are dead, and any inner corner good, then use any combination of good inner corners (only inner corners);
(7) if four cardinal cells are dead and four inner corners are dead, then use any combination of good outer middle cells (only outer middle cells); and
(8) if four cardinal cells are dead and four inner corners are dead and two outer middle cells are dead, then use any combination of outer corners.

The exemplary replacement masks for the 3×5 kernel illustrated in FIGS. 5A-5Q and the above-noted exemplary instruction set are intended to be illustrative in nature and not limiting in any way. In view of the above-described teachings, it will be apparent that similar replacement masks and instructions can be devised for replacement kernels of other sizes. Replacement masks, such as the exemplary 3×5 replacement masks illustrated above, can be stored in a look-up table in the memory 102 wherein a one-to-one correspondence is provided between an actual configuration of dead cells and an associated replacement mask to be used that can exclude various pixel values associated with various cells in a kernel for purposes of the calculation of a replacement pixel value for a first defective sensing element.

As an alternative to using replacement masks with mask values as discussed above, the processing unit can be configured to determine whether the area surrounding the first defective sensing element includes at least one additional defective sensing element of the detector array and to select pixel values of particular non-defective sensing elements adjacent to the first defective sensing element for use in calculating the replacement pixel value, wherein the selection of pixel values of particular non-defective sensing elements is based upon the determination of whether the area surrounding the first defective sensing element includes at least one addtional defective sensing element. In this regard, a selection process can be used in place of a multiplicative replacement mask such that a weighted average of selected pixel values is used to calculate the replacement pixel value. This approach can produce the same result as the approach that utilizes replacement masks.

In this regard, the processing unit can be configured to prevent a pixel value of a first non-defective sensing element adjacent to the first defective sensing element from contributing to the calculation of the replacement pixel value. Moreover, the position of the first non-defective sensing element whose pixel value is excluded can be based upon a position(s) of the additional defective sensing element(s).

As noted above, it is not required that all replacement masks, or configurations of selected pixel values be symmetrical to be used in calculating a replacement pixel value. Asymmetric replacement masks also produce results very close to what is expected.

An example using an asymmetric mask will now be described with reference to FIG. 7. Consider the sample image illustrated in FIG. 7A, wherein the grayscale values indicate a bright object in the upper left portion of the 3×5 replacement field, a gray diagonal line and a darker line at the bottom and center, and a somewhat lighter object on the right. Note that the center defective cell occupies an area of high contrast between two objects in the field of view. If it is assumed that there are no dead cells other than the center cell, the replacement value for the center cell would be 128.04, using the weighting coefficients shown in FIG. 7D and replacement mask 1 shown in FIG. 5A.

However, now assume that additional defective cells are asymmetrically present in the 3×5 field as shown in FIG. 7B. For instance, if it is assumed that two cardinal cells are also faulty, such as shown in FIG. 7B, regardless of which ones they are, all of the corners of the inner 3×3 region can be ignored. A possible replacement mask would be given by FIG. 7C. The element-by-element product of the weighting coefficients and replacement mask is shown in FIG. 7E. Multiplying those values by the corresponding pixel values element-by-element, and dividing the sum total of the weighting coefficients used produces a resulting replacement pixel value for the center cell of 99.819 as shown in FIG. 7F.

This result is logical, because data from the brighter cells to the left of the pixel of interest is deleted from the replacement calculation. If the data from the right side is ignored instead (i.e., if the defective cells were mirrored across the pixel of interest, with all cells on the left being functional), the center cell would be given a value of 172.28. This result would be acceptable also, considering the information in the cells to the left of the defective pixel. For a 3×3 replacement kernel, an average of the 9 cells would give 68.75. Averaging the good cells in the center 3 columns would give 110. Both of these latter values deviate significantly from the result of the exemplary 3×5 replacement scheme according to the present invention.

For the approaches described herein, calculating replacement pixel values for defective sensing elements located near an edge of the detector array can be easily addressed. In one example, where the size of a replacement kernel would extend beyond the edge of the detector array for a given defective sensing element whose replacement pixel value is to be calculated, the "missing" cells can be treated as defective, and an appropriate replacement mask can be chosen as discussed above based on that assumption. In an alternative example, the "missing" cells can be assigned fictitious values based on mirroring the values of existing cells about a line passing through the defective sensing element whose replacement value is to be calculated. Of course, any other suitable approach for addressing such edge effects can be used.

An exemplary approach 800 for generating a set of weighting coefficients according to the present invention will now be described with reference to FIG. 8. A set of weighting coefficients to be used in the above-described calculation of replacement pixel values be can generated using an empirical calculation and using calibration data of a calibration image. In this regard, the calibration data is obtained with the detector array and a corresponding optical system. Some amount of image contrast should be present in the calibration image for determining the weighting coefficients. For example, it can be beneficial to obtain a calibration image of the type typically expected to be obtained during operational use of the detector array. In addition, different combinations of detector arrays and optical systems can be expected to result in different values for weighting coefficients determined according to the approaches described herein.

Figure 8:
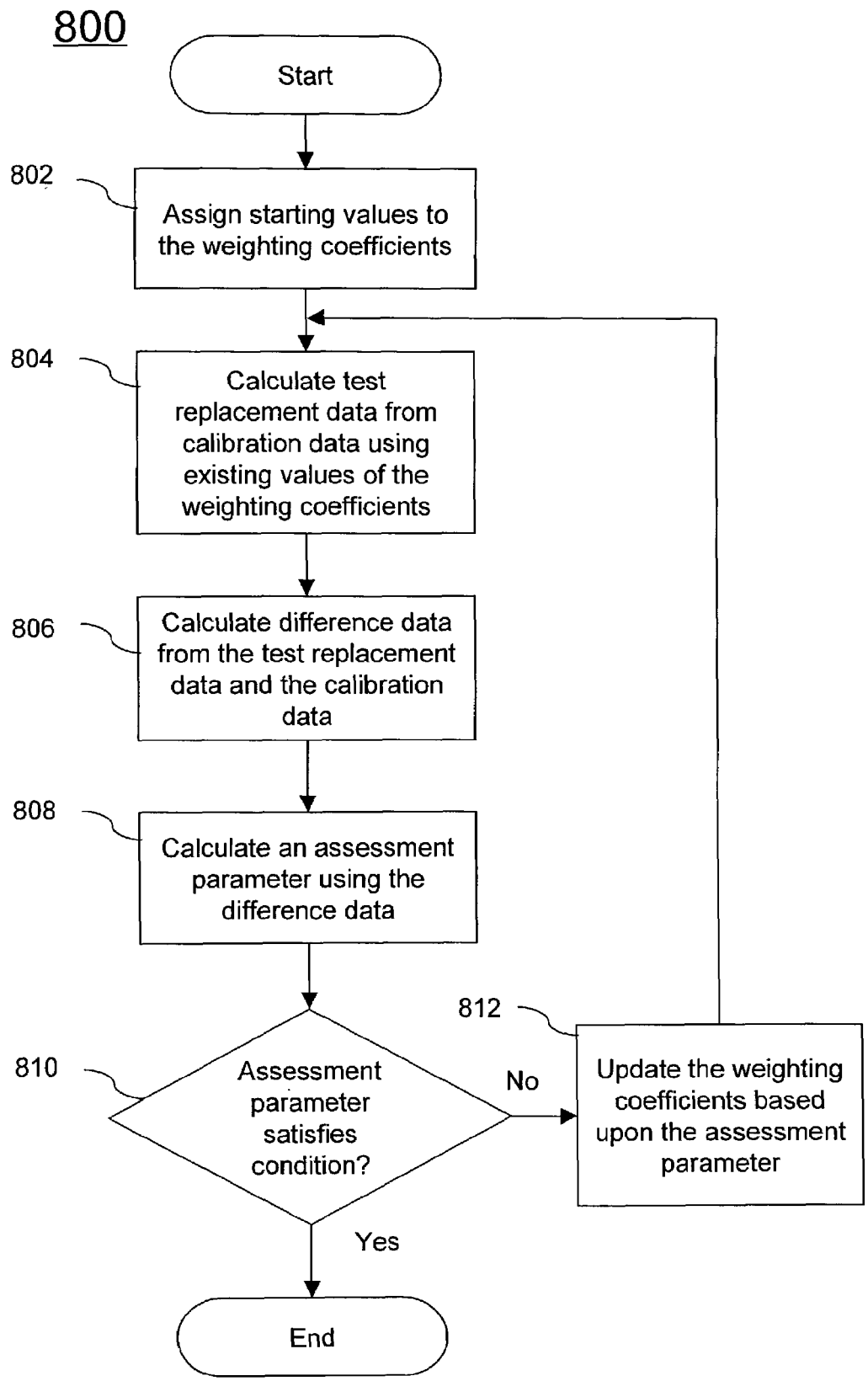
FIG. 8 is a flow diagram of an exemplary method of generating weighting coefficients according to the present invention.

FIG. 8 illustrates a flow diagram of an exemplary empirical method 800 for generating weighting coefficients according to the present invention. The method 800 can be carried out, for example, by the processing unit 104 illustrated in FIG. 1.

As illustrated in the flow diagram of FIG. 8, the method 800 comprises assigning starting values to the weighting coefficients (step 802). The choice of the starting coefficients is not critical to the method 800 and can affect how quickly this iterative approach will converge to final values. Nevertheless, an exemplary rationale for choosing starting values is as follows.

Starting values for the weighting coefficients can be assigned based upon a point-spread-function analysis. As discussed above, imaging systems have an associated blur spot, and some amount of the intensity that would be captured by a given sensing element in an otherwise perfect imaging system will spread to neighboring pixels. Stated differently, an amount of each cell's value will spread to neighboring pixels. In considering a given center cell, a percentage of its value will spread to the 4 cardinal cells that border it. A smaller percentage of the center cell's value will spread to the cells at the corners of a 3×3 region surrounding the center cell. Each of these corner cells will be more greatly affected by the cells directly (non-diagonally) adjacent to it.

For example, for a 3×5 region of sensing elements (cells) of a detector array, such as schematically illustrated in FIG. 9A, the point-spread of the center cell (8) will affect the immediately adjacent cardinal cells (3, 7, 9, 13) by some percentage that is dependent on system design, materials (optics and detector array), center-to-center distances between sensing elements, etc. The center (8) cell will affect the 'inner corner' cells (2, 4, 12, 14) also, but by a smaller amount. By the same geometry, the inner corner cells (2, 4, 12, 14) will be affected more by the cardinal cells (3, 7, 9, 13) than by the center cell (8). Therefore, if positive starting values are assigned to the weighting coefficients for the inner corners (2, 4, 12, 14), their effect on the center will not be representative of the actual contributions. Using negative weighting coefficients for the inner corners can provide a more appropriate geometry for calculating a replacement pixel value for a the center cell (8), which is assumed to be defective. Thus, assigning negative starting values to the weighting coefficients for the inner corners (2, 4, 12, 14) is appropriate. The same analysis holds for the outer corner cells (1, 5, 11, 15). These cells will be affected more by the cardinal cells (3, 7, 9, 13) and adjacent cells than by the center. Thus, the expected effect of the center cell on the corner cells (1, 5, 11, 15) will be more representative if the outer corners (1, 5, 11, 15) receive negative weighting coefficients. Hence, choosing negative starting values for the outer corners (1, 5, 11, 15) can be appropriate. Whether resulting final values for such weighting coefficients are calculated to be positive or negative can depend upon whether single dead pixels or clusters of dead pixels are considered and can also depend on physical aspects of the corresponding detector array and optical system.

For cells that are relatively farther away from a center cell, those cell's effect on the center cell become relatively less. Thus, the magnitudes of the associated weighting coefficients can be expected to decrease. In view of the reasoning described here, the starting values for the weighting coefficients were assigned to be negative for the inner and outer corners of an exemplary set of weighting coefficients configured in a 3×5 two-dimensional array. Normalizing the coefficients to 1 at the cardinal cells, starting values for the exemplary 3×5 set of weighting coefficients was chosen as reflected in FIG. 9B. Of course, the values illustrated in FIG. 9B are exemplary and are not intended to be limiting in any way.

Figure 10:
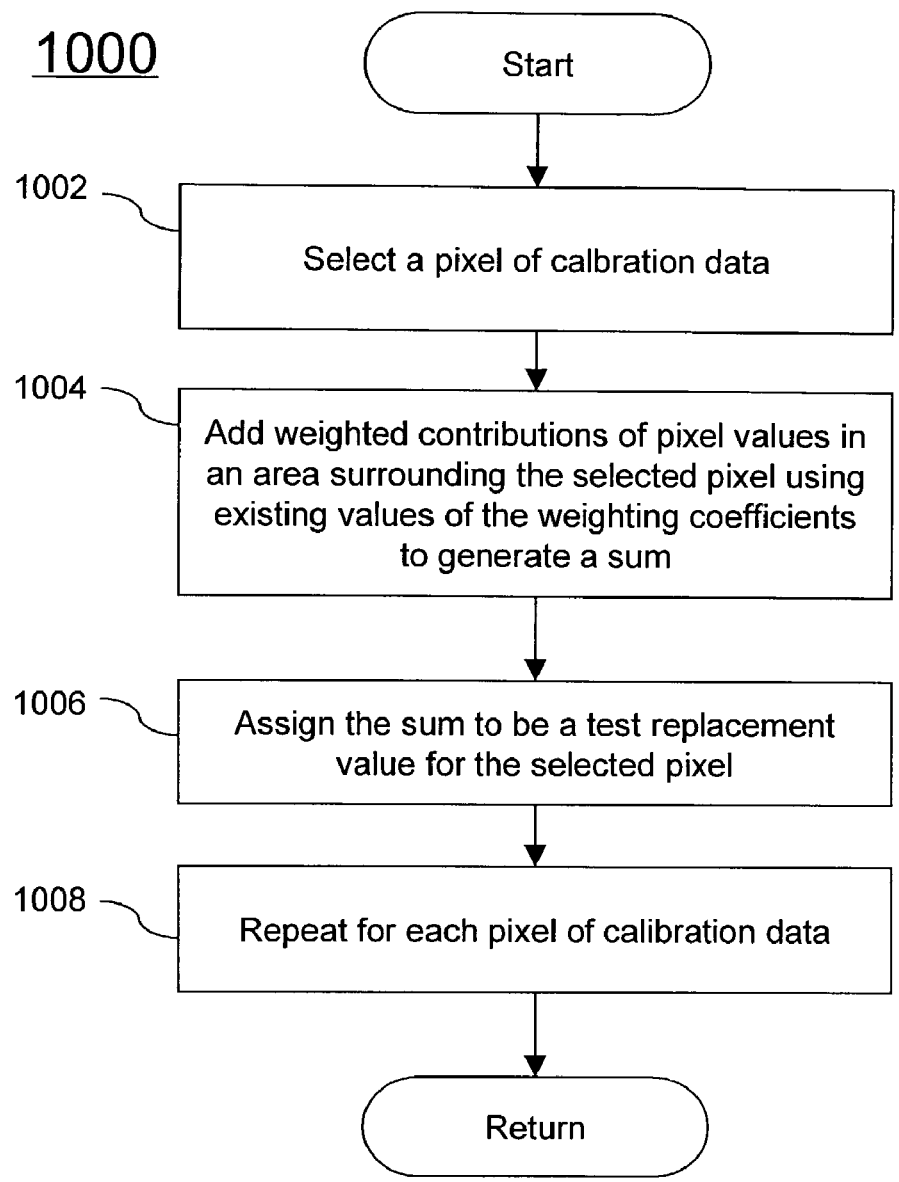
FIG. 10 illustrates an exemplary method of calculating test replacement data in accordance with FIG. 8 according to the present invention.

The method 800 also comprises calculating test replacement data from the calibration data using existing values of the weighting coefficients (step 804). An exemplary approach 1000 for calculating test replacement data is illustrated in FIG. 10. The approach 1000 comprises selecting a pixel of the calibration data of the calibration image, summing weighted contributions of pixel values in an area of the calibration image surrounding the selected pixel using existing values of the weighting coefficients to generate a sum (such as described in the example of FIGS. 3A-3D above), assigning the sum to be a test replacement value for the selected pixel, and repeating the three immediately preceding steps for each pixel of the calibration data of the calibration image. This approach, in effect, treats each pixel of the calibration image, in turn, as if it were a defective pixel whose value is replaced with a replacement pixel value using existing values of the weighting coefficients.

The method 800 also comprises calculating difference data from the test replacement data and the calibration data (step 806). In other words, one image of the above is subtracted from the other. It will be appreciated in this regard that if the existing values of the weighting coefficients were relatively optimum, the difference data would yield a null image with little or no image contrast and pixel values close to zero.

The method 800 further comprises calculating an assessment parameter for the difference data (step 808). The assessment parameter can be, for example a root-mean-square (RMS) value of all the pixel values of difference data. As another example, the assessment parameter can be a sum of the absolute values of the pixel values for the difference data. Any suitable function of the pixel values of the difference data can be used as long as negative values of the difference data do not artificially offset positive pixel values.

The method 800 also comprises determining whether the assessment parameter satisfies a predetermined condition (step 810). For example, the predetermined condition can be whether the present assessment parameter is less than a previous assessment parameter. As another example, the assessment parameter can be a predetermined number chosen based upon experience for which it has been determined that the difference data is sufficiently null that accurate defective pixel replacement is achieved.

The method 800 further comprises updating the weighting coefficients based upon the assessment parameter if the assessment does not satisfy the predetermined condition (step 812). For example, if the assessment parameter does not satisfy the predetermined number, or if the assessment parameter has increased rather than decreased compared to the previous iteration, some of the weighting coefficients can be appropriately increased or decreased.

This process can be repeated iteratively wherein some of the weighting coefficients are changed while others are held constant. Choosing how to group weighting coefficients together for purposes of making changes to the weighting coefficients can be done, for example, in view of symmetry considerations. For example, based on symmetry, it can be desirable to require that the cardinal cells all have the same value, that the inner corner cells all have the same value, and that the outer corner cells all have the same value, etc. Alternatively, the weighting coefficient can be treated completely independently and can be randomly selected for changing during the course of repeated iterations.

Various sets of exemplary weighting coefficients calculated according to this approach are illustrated in FIGS. 11A and 11B for various kernel sizes from a 3×3 kernel to a 7×7 kernel. These sets of weighting coefficients were calculated using an exemplary calibration image of a docked ship, and were calculated, as reflected above, by replacing the value of each pixel in the calibration image as if it was the only dead "cell". The values in FIGS. 11A and 11B were not determined based upon an analysis of clusters of defective elements. FIGS. 11A and 11B show the kernel sizes that were considered, and exemplary final weighting coefficients are shown for each cell of the respective kernels. The calculated RMS error is indicated for each kernel error and represents the RMS error between the resultant image at the end of the iteration and the original input image.

Where the predetermined condition referred to above is a condition for checking whether the assessment parameter has decreased compared to the previous iteration, the method 800 can be viewed as an n-dimensional, iterative error-minimization approach. Algorithms for minimizing n-dimensional quantities are known to those skilled in the art in other contexts, and such algorithms can be applied to the determination of final weighting coefficients as described above.

An exemplary approach for carrying out the method 800 was discussed above assuming that the value of each pixel in the calibration image was treated as if it was the only dead "cell". However, the method 800 can be implemented using an approach that replaces each pixel in the calibration image under an assumption that clusters of defective pixels are present. This cluster approach will now be described with in the exemplary context of a 3×5 kernel. However, the approach is not limited to a 3×5 kernel and can be used to generate weighting coefficients for kernels of other sizes.

In one example, an approach that considers clusters in generating a set of weighting coefficients for a kernel of a given size involves a first step of determining the number of replacement masks available. For the 15 cells of a 3×5 kernel, for example, there are in principle $2^{15}$ combinations of the defective cells. Of these, half can be eliminated because the center cell is always assumed to be zero as discussed previously. Thus, as described previously, there are $2^{14}$ combinations, which can be reduced significantly in view of symmetry considerations. As discussed above, a total of 113 replacement masks were selected. However, more than 113 replacement masks could be used if desired. Generally, the number of masks can be limited, if desired, to a number of masks that is consistent with the computational resources of the system.

After an appropriate number of masks is selected, the weighting coefficients can be generated. To perform this analysis, each replacement mask can be evaluated with a given symmetric set of coefficients under an assumption that clusters of dead cells are allowed. Through iterative error minimization, the coefficient magnitudes (and polarities) can be adjusted to provide a minimum RMS error in comparison to an unprocessed image. This will now be described in greater detail.

First, the cardinal mask can be evaluated as a baseline for comparison. This represents the instance in which only the cells immediately above, below, and to the left and right of the selected pixel of interest are used in the replacement scheme. An image can be selected to test this replacement scheme. Then, every pixel can be replaced using this scheme, as if each pixel were the only defective pixel in the image. Each of the cardinal cells can be used with a weighting of 1.0, and an average of the four cardinal cells can be taken to determine the replacement value of the center cell. The resultant image can be compared to the original input to determine the error generated.

Next, a 3×5 kernel can be processed. Each pixel of the calibration image can be replaced as if it were the only defective pixel, to develop a fully-replaced image. In this regard, the coefficients can be initialized based on a point-spread-function analysis, which was previously described above. In this regard, starting values for the weighting coefficients can be chosen to be those shown in FIG. 9B, for example, for a 3×5 kernel.

The single-cell replacement of the entire calibration image can be repeated iteratively such as described previously. For example, the cardinal values can be changed in small steps to determine the effect of those changes. Then the inner corner cells can be adjusted, then the outer-middle cells, and then the outer corners. If the error between the original and the replaced image improves (i.e., less error) at the end of one iteration, then the same set of coefficients can be reduced slightly (in the same direction) and the process can be repeated. If the error increases, the set of coefficients that had been changed can subsequently be changed in the opposite direction. This process can be performed for each group of weighting coefficients (cardinal cells, inner corners, outer corners, outer middle cells). When a low-point for the overall error (the assessment parameter in FIG. 8) is found in this process, it can be assumed that an acceptable first level of approximation for the weighting coefficients has been found.

For purposes of comparison, the entire calibration image can undergo a replacement calculation using a single-defective-pixel approach, and can then be compared with the original calibration image as well as the result of the cardinal-cells-only replacement scheme.

With a first level of approximation for the starting coefficients now determined, multiple dead-cell patterns can be analyzed. For example, random dead-cell combinations can be selected such that as many replacement masks having multiple dead cells as desired can be tested (e.g., in the example of a 3×5 kernel, the 113 replacement masks disclosed herein can be used). Random selection of the replacement masks can be accomplished by choosing a random number in a given range appropriate for the kernel size (e.g., 0-32767 for a 3×5 kernel), and converting the number to a binary value, where each bit represents the state (good/bad) of a cell in the replacement mask. Values with a '1' in the center can be ignored, because such values represent a properly function center cell for which there is no need to analyze. For each replacement mask thus chosen, test replacement data can be calculated using the particular replacement mask, difference data can be calculated, and an assessment parameter (e.g., an RMS error) can be calculated to assess whether given coefficients should be incremented, decremented or kept constant. The step size for incrementing or decrementing the weighting coefficients can be chosen as desired but should not be too large such that convergence becomes unstable. With sufficient processing speed, a small step size of one bit can be used.

The above described random selections and iterations can be carried out until the assessment parameter falls below a predetermined value that can be chosen based upon experience or until a suitable minimum in the assessment parameter is found. This approach was, for example, implemented for a 3×5 kernel using a calibration image, and the optimum weighting coefficients were ultimately determined to be −0.035 for the outer corners, −0.350 for the inner corners, +1.000 for the cardinal cells, and +0.100 for the outer middle cells.

It was recognized that these coefficients can be adjusted slightly to facilitate optimum performance on a binary processor. In this regard, the above-noted coefficients were adjusted slightly to arrive at the exemplary weighting coefficients shown in FIGS. 4D and 7D, which were considered to be optimum for a particular exemplary implementation. In particular, to optimize the addition and multiplication steps in this example, it was determined that the maximum value of the summation of these coefficients should be less then 4.0.

It will be noted that positions of negative weighting coefficients in the example of the 3×5 kernel of FIG. 4D (based upon consideration of clusters of defective elements) differ from the positions of negative weighting coefficients in the example of the 3×5 kernel in FIG. 11A (based upon consideration of single defective sensing elements). Such differences can occur, for example, where different approaches are used to calculate the weighting coefficients (i.e., a single-pixel approach or a cluster approach) and/or where different detector arrays and optical systems are involved. Nevertheless, both the single-pixel approach or the cluster approach described above can provide appropriate sets of weighting coefficients, even if such sets of weighting coefficients would differ.

The above-described approach can be applied to kernels of sizes other than 3×5, although the processing requirements for carrying out such calculations on larger kernels can rapidly become significant. Of course, the above-described exemplary approaches relating to FIGS. 8 and 10 are illustrative in nature and are not intended to be limiting in any way.

In view of the above, it will be appreciated that the calculation of replacement pixel values according to the present invention can provide advantages. For example, exemplary embodiments of the present invention are not limited to using a simple average of pixel values of sensing elements adjacent to the first defective sensing element. Rather, the replacement pixel value can be calculated from a weighted average of pixel values from sensing elements adjacent to a first defective sensing element of the detector array wherein different pixel values used in the calculation can have different weighting coefficients. In addition, exemplary embodiments of the present invention can utilize a set of weighting coefficients having at least one negative weighting coefficient that can be used in calculating the replacement pixel value.

Pixel values used to determine a replacement pixel value according to exemplary embodiments of the present invention are not limited to exemplary embodiments of those pixel values from sensing elements that border the first defective sensing element, such as the cardinal cells that border the first defective sensing element. Rather, a replacement pixel value can be generated using pixel values from sensing elements located at a variety of pixel distances from the defective sensing element including, but not limited to, 1, 2 or 3 pixels in the positive and negative X and Y directions, for example. In other words, for a two-dimensional detector array, a replacement pixel value can be calculated using sensing elements adjacent to a defective sensing element in areas of various pixel sizes surrounding the defective sensing element including, but not limited to, a 3×3 area, a 3×5 area, a 5×5 area, a 5×7 area, a 7×5 area, and a 7×7 area, for example. For a one-dimensional array, a replacement pixel value can similarly be calculated using pixel values from sensing elements located at a variety of pixel distances from the defective sensing element including, but not limited to, 1, 2 or 3 pixels in a lengthwise direction along the detector array.

It has been recognized that carrying out defective pixel replacement using pixel values from cells two columns in distance away from the first defective sensing element (center cell) seems counter-intuitive. Considering the technological aspects of the system, it would seem that use of a 3×5 replacement mask could add uncorrelated information to the algorithm, resulting in less accurate values. In this regard, the point-spread-function (PSF) of the sensor can be viewed as a factor. The Airy disk diameter of 3rd generation FLIR designs is on the order of 2 pixels or less. Consequently, it may seem that extending the kernel size beyond ±1 pixel from a first defective sensing element (center cell) could create more error than simply using the adjacent pixels. The 3×5 mask appears as if it would dilute the more representative adjacent pixel values with less representative data. For example, use of a 3×5 kernel for dead-cell replacement causes information 2 pixels away from the center cell to contribute to the replacement pixel value. One may expect that a sharp edge 2 pixels away should have no contribution to the replacement value for a defective cell. However, empirical data shows that a portion of intensity data two cell distances removed from a cell of interest actually can correlate to that center cell. As shown by the exemplary test results in Table I for a 3×5 kernel, using intensity data two cell distances away from a center cell can improve the accuracy of calculated replacement values.

Column 2 of Table I provides the RMS error between an original calibration image and a replacement image calculated using weighting coefficients generated according to exemplary embodiments of the present invention for each of the 113 replacement masks, which reflect different configurations of clustered defective sensing elements that might be encountered with a typical FPA. Column 3 of Table I provides the RMS error between the original calibration image and a replacement image calculated using the conventional approach of a simple average of the cardinal cells for each of those same mask configurations. Column 4 shows the difference between these RMS errors as percent improvement using the 3×5 replacement scheme.

As reflected in Table I, exemplary embodiments of the present invention can provide significant improvement although there are some instances of negative values, which indicate cases in which conventional treatment with cardinal cells is marginally better, and four cases in which the conventional treatment is actually desirable. These four entries are shaded in the Table I, and represent the conditions in which the only the outer corners and a single cardinal cell are functional. For these instances, it is worthwhile to ignore the outer pixels and use only the functional cardinal cells in the replacement algorithm. There are also multiple cases in which all four of the cardinal cells may be defective. In these instances, there is no replacement value in the 3rd column, and therefore the improvement is not evaluated numerically. Also note that for the replacement mask in which only the center cell is defective (Mask 1 in FIG. 5A), the improvement over the conventional process is over 22%, as noted in the first entry of Table I.

In another exemplary aspect of the present invention, there is provided a computer-readable carrier containing a computer program adapted to program a computer to execute approaches for image processing described herein. In this regard, the computer-readable carrier can be, for example, solid-state memory, magnetic memory such as a magnetic disk, optical memory such as an optical disk, a modulated wave (such as radio frequency, audio frequency or optical frequency modulated waves), or a modulated downloadable bit stream that can be received by a computer via a network or a via a wireless connection.

Some additional details relating to the exemplary apparatus 100 illustrated in FIG. 1 will now be described. The processing unit 104 can be, for example, any suitable field programmable gate array (FPGA) programmed to carry out the steps described herein. Suitable present-generation FPGAs include the Virtex and Virtex-E series devices manufactured by Xilinx, Inc. (San Jose, Calif.), for example. Alternatively, the processing unit can be any suitable processor such as, for example, a high-performance Altivec microprocessor manufactured by Motorola. It will be readily apparent to those skilled in the art that as processor power continues to increase, it can become desirable to carry out numerical computations using processors that are considered conventional as this can be beneficial from the standpoint of programming flexibility. In an exemplary aspect of the present invention, given the computational power of present generation processors, it can be advantageous to allocate the calculation of replacement pixel values to an FPGA device. In addition, although one processing unit 104 is illustrated in FIG. 1, the present invention can be implemented using more than one processing unit if desired. Alternatively, one or more specialized circuits designed to carry out the approaches described herein can be used.

The memory 102 can be any suitable memory (e.g., solid-state memory, optical memory, magnetic memory, etc.) for storing weighting coefficients, data identifying defective sensing elements, as well as a computer program to program a processing unit to execute approaches described herein. In addition, any suitable combination of hardware, software and firmware can be used to carry out the approaches described herein.

Figure 12:
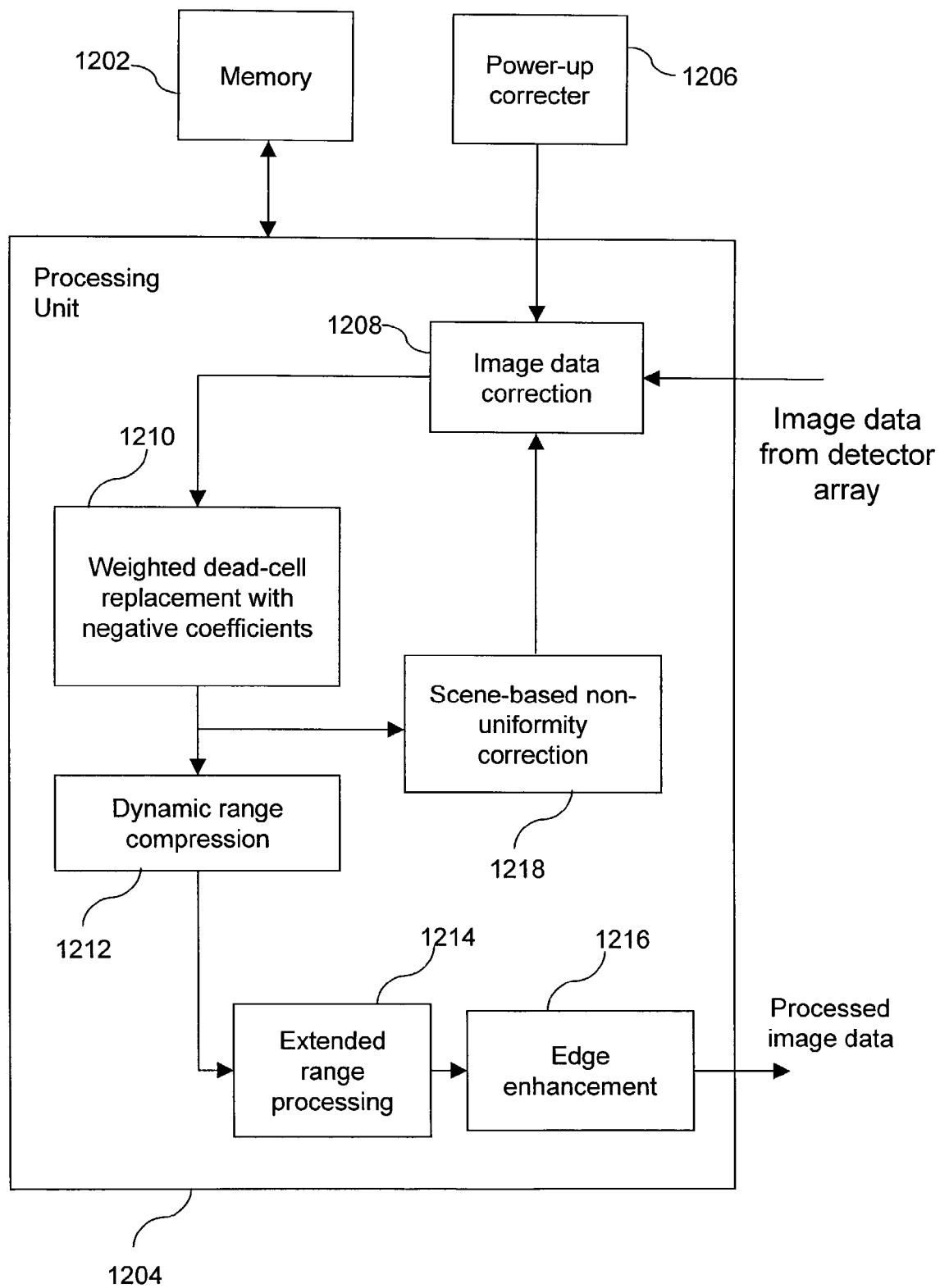
FIG. 12 is a function block diagram of an exemplary image processing system according to the present invention.

In addition present invention can also be implemented in an image processing system comprising a variety of other functional components. An exemplary image processing system 1200 according to this aspect of the invention is illustrated in FIG. 12. As shown therein, the image processing system 1200 comprises a memory 1202 and a processing unit 1204, which can comprise a variety of functional blocks. In particular, the processing unit 1204 comprises a weighted dead-cell replacement block 1210 according to the present invention, such as described above. In addition, the processing unit can comprise a power-up corrector 1206 for providing corrected gain and offset coefficients for a detector array and an image data correction block that can utilize the corrected gain and offset coefficients to correct image data received from the detector array. The processing unit can also comprise a scene-based non-uniformity correction (SB-NUC) block 1218 that can provide ongoing updates to the gain and/or offset coefficients, such as described for example in U.S. patent application Ser. No. 09/840,920, now U.S. Pat. No. 6,901,173, entitled "Scene-Based Non-Uniformity Correction for Detector Arrays" and U.S. patent application Ser. No. 10/125,348, now U.S. Pat No. 7,016,550, entitled "Scene-Based Non-Uniformity Offset Correction for Staring Arrays", the entire contents of each of which are incorporated herein by reference. The processing unit can also comprise a dynamic range compression block 1212, such as described for example in U.S. patent application Ser. No. 09/841,081, now U.S. Pat. No. 6,973,218, entitled "Dynamic Range Compression", the entire contents of which are incorporated herein by reference. The processing unit 1204 can also comprise an extended range processing block 1214, such as described in U.S. patent application Ser. No. 09/841,079, now U.S. Pat. No. 7,103,235, entitled "Extended Range Image Processing for Electro-optical Systems", the entire contents of each of which are incorporated herein by reference. The processing unit can also comprise an edge enhancement block 1216. Edge enhancement is generally known to those of ordinary skill in the art.

The invention has been described with reference to particular embodiments. However, it will be readily apparent to those skilled in the art that it is possible to embody the invention in specific forms other than those of the embodiments described above. This can be done without departing from the spirit of the invention. For example, the replacement of defective pixels with calculated replacement pixel values can be applied over an entire image or over an image window whose size is smaller than the entire image if desired.

The embodiments described herein are merely illustrative and should not be considered restrictive in any way. The scope of the invention is given by the appended claims, rather than the preceding description, and all variations and equivalents which fall within the range of the claims are intended to be embraced therein.

TABLE I

Comparison of RMS error in defective pixel replacement between 3 × 5 kernel and simple average using cardinal cells.

| Mask Number | RMS error with 3 × 5 kernel | RMS error with simple average of cardinal cells | % Improvement |
|---|---|---|---|
| 1 | 61.13211874 | 78.85056188 | 22.4 |
| 2 | 75.55082337 | 91.39624661 | 17.3 |
| 3 | 57.66703367 | 78.85056188 | 26.8 |
| 4 | 71.05486665 | 91.39624661 | 22.2 |
| 5 | 77.81398197 | 93.68559021 | 16.9 |
| 6 | 77.88362199 | 93.68559021 | 16.8 |
| 7 | 77.98288948 | 93.92296956 | 16.9 |
| 8 | 78.09007373 | 93.92296956 | 16.8 |
| 9 | 78.68430551 | 78.85056188 | 0.2 |
| 10 | 91.4650445 | 91.39624661 | −0.0 |
| 11 | 92.19649496 | 93.68559021 | 1.5 |
| 12 | 115.6974899 | 117.9482945 | 1.9 |
| 13 | 92.41094137 | 93.92296956 | 1.6 |
| 14 | 125.5111759 | 128.274976 | 2.1 |
| 15 | 99.55748568 | 104.0859418 | 4.3 |
| 16 | 163.0504815 | 175.2515282 | 6.9 |

TABLE I-continued

Comparison of RMS error in defective pixel replacement between 3 × 5 kernel and simple average using cardinal cells.

| Mask Number | RMS error with 3 × 5 kernel | RMS error with simple average of cardinal cells | % Improvement |
|---|---|---|---|
| 17 | 76.3178322 | 78.85056188 | 3.2 |
| 18 | 89.63281753 | 91.39624661 | 1.9 |
| 19 | 92.36062015 | 93.68559021 | 1.4 |
| 20 | 119.8131292 | 117.9482945 | −1.5 |
| 21 | 92.6072334 | 93.92296956 | 1.4 |
| 22 | 131.4801249 | 128.274976 | −2.5 |
| 23 | 104.2111018 | 104.0859418 | −0.1 |
| 24 | 195.202124 | 175.2515282 | 11.3 |
| 25 | 75.44761974 | 91.29348451 | 17.3 |
| 26 | 91.37121339 | 91.29348451 | −0.0 |
| 27 | 93.02610609 | 90.57627723 | −2.7 |
| 28 | 125.2004815 | 127.9151504 | 2.1 |
| 29 | 152.1820219 | 155.5901444 | 2.1 |
| 30 | 115.6811804 | 117.9528004 | 1.9 |
| 31 | 152.0226246 | 155.5007086 | 2.2 |
| 32 | 162.5454854 | 174.6928078 | 6.9 |
| 33 | 70.91410334 | 91.29348451 | 22.3 |
| 34 | 89.51543917 | 91.29348451 | 1.9 |
| 35 | 87.65576945 | 90.57627723 | 3.2 |
| 36 | 131.1013584 | 127.9151504 | −2.4 |
| 37 | 170.3169461 | 155.5901444 | −9.4 |
| 38 | 119.7811827 | 117.9528004 | −1.5 |
| 39 | 170.0964449 | 155.5007086 | −9.3 |
| 40 | 194.5132364 | 174.6928078 | −11.3 |
| 41 | 188.7721845 | | |
| 42 | 204.0236415 | | |
| 43 | 199.9311285 | | |
| 44 | 223.011434 | | |
| 45 | 199.6454825 | | |
| 46 | 249.4156522 | | |
| 47 | 193.0769537 | | |
| 48 | 271.9101339 | | |
| 49 | 64.54770949 | 78.85056188 | 18.1 |
| 50 | 78.86942517 | 91.39624661 | 13.7 |
| 51 | 60.33708752 | 78.85056188 | 23.4 |
| 52 | 73.92948114 | 91.39624661 | 19.1 |
| 53 | 80.57070191 | 93.68559021 | 14.0 |
| 54 | 79.48014176 | 93.68559021 | 15.1 |
| 55 | 129.2086212 | | |
| 56 | 142.8135464 | | |
| 57 | 142.0900639 | | |
| 58 | 181.838229 | | |
| 59 | 141.8118236 | | |
| 60 | 170.735673 | | |
| 61 | 136.4456756 | | |
| 62 | 210.2089978 | | |
| 63 | 80.73291082 | 93.92296956 | 14.0 |
| 64 | 79.67880937 | 93.92296956 | 15.1 |
| 65 | 81.25637427 | 78.85056188 | −3.0 |
| 66 | 93.50079736 | 91.39624661 | −2.3 |
| 67 | 94.02808137 | 93.68559021 | −0.3 |
| 68 | 115.4620273 | 117.9482945 | 2.1 |
| 69 | 94.23469718 | 93.92296956 | −0.3 |
| 70 | 124.1526695 | 128.274976 | 3.2 |
| 71 | 101.1856665 | 104.0859418 | 2.7 |
| 72 | 154.0389623 | 175.2515282 | 12.1 |
| 73 | 78.85056188 | 78.85056188 | 0.0 |
| 74 | 91.39624661 | 91.39624661 | 0.0 |
| 75 | 93.68559021 | 93.68559021 | 0.0 |
| 76 | 117.9482945 | 117.9482945 | 0.0 |
| 77 | 93.92296956 | 93.92296956 | 0.0 |
| 78 | 128.274976 | 128.274976 | 0.0 |
| 79 | 104.0859418 | 104.0859418 | 0.0 |
| 80 | 175.2515282 | 175.2515282 | 0.0 |
| 81 | 142.9392581 | | |
| 82 | 147.3308417 | | |
| 83 | 170.9968901 | | |
| 84 | 232.4034484 | | |
| 85 | 204.2471576 | | |
| 86 | 213.2486312 | | |
| 87 | 249.7003989 | | |

TABLE I-continued

Comparison of RMS error in defective pixel replacement between 3 × 5 kernel and simple average using cardinal cells.

| Mask Number | RMS error with 3 × 5 kernel | RMS error with simple average of cardinal cells | % Improvement |
| --- | --- | --- | --- |
| 88 | 300.9342752 | | |
| 89 | 78.78692464 | 91.29348451 | 13.7 |
| 90 | 93.41842522 | 91.29348451 | −2.3 |
| 91 | 96.0792385 | 90.57627723 | −6.0 |
| 92 | 123.8567696 | 127.9151504 | 3.1 |
| 93 | 145.6052866 | 155.5901444 | 6.4 |
| 94 | 115.4749382 | 117.9528004 | 2.1 |
| 95 | 145.5400159 | 155.5007086 | 6.4 |
| 96 | 153.6277994 | 174.6928078 | 12.0 |
| 97 | 177.7877313 | | |
| 98 | 253.109134 | | |
| 99 | 73.81733695 | 91.29348451 | 19.1 |
| 100 | 91.29348451 | 91.29348451 | 0.0 |
| 101 | 90.57627723 | 90.57627723 | 0.0 |
| 102 | 127.9151504 | 127.9151504 | 0.0 |
| 103 | 155.5901444 | 155.5901444 | 0.0 |
| 104 | 117.9528004 | 117.9528004 | 0.0 |
| 105 | 155.5007086 | 155.5007086 | 0.0 |
| 106 | 252.9144766 | | |
| 107 | 222.7430237 | | |
| 108 | 300.9013264 | | |
| 109 | 181.5375438 | | |
| 110 | 232.2244323 | | |
| 111 | 174.6928078 | 174.6928078 | 0.0 |
| 112 | 209.247555 | | |
| 113 | 270.5618811 | | |

What is claimed is:

1. An apparatus for processing image data, comprising:
a memory; and
a processing unit coupled to the memory, the processing unit being configured to
obtain a set of weighting coefficients to be used in calculating replacement pixel values associated with defective sensing elements of a detector array, the set of weighting coefficients including at least one negative weighting coefficient, wherein the set of weighting coefficients is configured as a two-dimensional array of (N·M)-1 weighting coefficients, N and M being integers, and values for N and M are chosen based upon a size of a blur spot in a plane of the detector array, the blur spot being associated with the detector array and a corresponding optical system,
obtain information identifying one or more defective sensing elements of the detector array,
receive image data of an image from the detector array,
calculate a weighted average of pixel values from sensing elements adjacent to a first defective sensing element of the detector array using at least some of the weighting coefficients, and
assign the weighted average to be a replacement pixel value for the first defective sensing element.

2. The apparatus of claim 1, wherein the sensing elements adjacent to the first defective sensing element are located within ±3 units of the first defective pixel in at least one of two directions, wherein a size of one unit in a given direction is equivalent to size of one sensing element of the detector array in that direction.

3. The apparatus of claim 1, wherein the blur spot encompasses an area at least of N·M units in the plane of the detector array, and wherein a size of one unit in a given direction is equivalent to size of one sensing element of the detector array in that direction.

4. The apparatus of claim 3, wherein M=3 and N=5.

5. The apparatus of claim 1, wherein the set of weighting coefficients is generated using an empirical calculation and using calibration data of a calibration image, the calibration image data obtained with the detector array and the corresponding optical system.

6. The apparatus of claim 5, wherein the empirical calculation for generating the weighting coefficients comprises:
assigning starting values to the weighting coefficients;
calculating test replacement data from the calibration data using existing values of the weighting coefficients;
calculating difference data from the test replacement data and the calibration data;
calculating an assessment parameter for the difference data;
determining whether the assessment parameter satisfies a predetermined condition; and
updating the weighting coefficients based upon the assessment parameter if the assessment does not satisfy the predetermined condition.

7. The apparatus of claim 6, wherein calculating test replacement data comprises:
selecting a pixel of the calibration data of the calibration image;
summing weighted contributions of pixel values in an area of the calibration image surrounding the selected pixel using existing values of the weighting coefficients to generate a sum;
assigning the sum to be a test replacement value for the selected pixel; and
repeating the three immediately preceding steps for each pixel of the calibration data of the calibration image.

8. The apparatus of claim 1, wherein the processing unit is configured to:
determine whether the area surrounding the first defective sensing element includes at least one additional defective sensing element of the detector array;
select a set of mask values based upon the determination of whether the area surrounding the first defective sensing element includes at least one additional defective sensing element; and
apply the mask values in the calculation of the replacement pixel value, wherein the mask values determine which ones of pixel values of non-defective sensing elements adjacent to the first defective sensing element contribute to the calculation of the replacement pixel value.

9. The apparatus of claim 8, wherein applying the mask values prevents a pixel value of a first non-defective sensing element adjacent to the first defective sensing element from contributing to the calculation of the replacement pixel value.

10. The apparatus of claim 9, wherein the set of mask values is configured such that a position of the first non-defective sensing element whose pixel value is excluded is based upon a position of the at least one additional defective sensing element.

11. The apparatus of claim 1, wherein the processing unit is configured to:
determine whether the area surrounding the first defective sensing element includes at least one additional defective sensing element of the detector array; and
select pixel values of particular non-defective sensing elements adjacent to the first defective sensing element for use in calculating the replacement pixel value, wherein the selection of pixel values of particular non-defective sensing elements is based upon the determination of whether the area surrounding the first defective sensing element includes at least one additional defective sensing element.

12. The apparatus of claim 11, wherein the processing unit is configured to prevent a pixel value of a first non-defective sensing element adjacent to the first defective sensing element from contributing to the calculation of the replacement pixel value.

13. The apparatus of claim 12, wherein a position of the first non-defective sensing element whose pixel value is excluded is based upon a position of the at least one additional defective sensing element.

14. A method of processing image data, comprising:
obtaining a set of weighting coefficients to be used in calculating replacement pixel values associated with defective sensing elements of a detector array, the set of weighting coefficients including at least one negative weighting coefficient, wherein the set of weighting coefficients is configured as a two-dimensional array of (N·M)−1 weighting coefficients. N and M being integers, and values for N and M are chosen based upon a size of a blur spot in a plane of the detector array, the blur spot being associated with the detector array and a corresponding optical system;
obtaining information identifying one or more defective sensing elements of the detector array;
receiving image data from the detector array;
calculating a weighted average of pixel values from sensing elements adjacent to a first defective sensing element of the detector array using at least some of the weighting coefficients; and
assigning the weighted average to be a replacement pixel value for the first defective sensing element.

15. The method of claim 14, wherein the sensing elements adjacent to the first defective sensing element are located within ±3 units of the first defective pixel in at least one of two directions, and wherein a size of one unit in a given direction is equivalent to size of one sensing element of the detector array in that direction.

16. The method of claim 15, wherein the blur spot encompasses an area at least of N·M units in the plane of the detector array, and wherein a size of one unit is equivalent to size of one sensing element of the detector array.

17. The method of claim 16, wherein M=3 and N=5.

18. The method of claim 14, wherein the set of weighting coefficients is generated using an empirical calculation and using calibration data of a calibration image, the calibration data being obtained with the detector array and the corresponding optical system.

19. The method of claim 18, wherein the empirical calculation for generating the weighting coefficients comprises:
assigning starting values to the weighting coefficients;
calculating test replacement data from the calibration data using existing values of the weighting coefficients;
calculating difference data from the test replacement data and the calibration data;
calculating an assessment parameter for the difference data;
determining whether the assessment parameter satisfies a predetermined condition; and
updating the weighting coefficients based upon the assessment parameter if the assessment does not satisfy the predetermined condition.

20. The method of claim 18, wherein calculating test replacement data comprises:
selecting a pixel of the calibration data of the calibration image;
summing weighted contributions of pixel values in an area of the calibration image surrounding the selected pixel using existing values of the weighting coefficients to generate a sum;
assigning the sum to be a test replacement value for the selected pixel; and
repeating the three immediately preceding steps for each pixel of the calibration data of the calibration image.

21. The method of claim 14, comprising:
determining whether the area surrounding the first defective sensing element includes at least one additional defective sensing element of the detector array;
selecting a set of mask values based upon the determination of whether the area surrounding the first defective sensing element includes at least one additional defective sensing element; and
applying the mask values in the calculation of the replacement pixel value, wherein the mask values determine which ones of pixel values of non-defective sensing elements adjacent to the first defective sensing element contribute to the calculation of the replacement pixel value.

22. The method of claim 21, wherein applying the mask values prevents a pixel value of a first non-defective sensing element adjacent to the first defective sensing element from contributing to the calculation of the replacement pixel value.

23. The method of claim 22, wherein the set of mask values is configured such that a position of the first non-defective sensing element whose pixel value is excluded is based upon a position of the at least one additional defective sensing element.

24. The method of claim 14, comprising:
determining whether the area surrounding the first defective sensing element includes at least one additional defective sensing elements of the detector array; and
selecting pixel values of particular non-defective sensing elements adjacent to the first defective sensing element for use in calculating the replacement pixel value, wherein the selection of pixel values of particular non-defective sensing elements is based upon the determination of whether the area surrounding the first defective sensing element includes at least one additional defective sensing element.

25. The method of claim 24, comprising excluding a pixel value of a first non-defective sensing element adjacent to the first defective sensing element from contributing to the calculation of the replacement pixel value.

26. The method of claim 25, wherein a position of the first non-defective sensing element whose pixel value is excluded depends upon a position of the at least one additional defective sensing element.

27. An apparatus for processing image data, comprising:
a memory; and
a processing unit coupled to the memory, the processing unit being configured to:
obtain a set of weighting coefficients to be used in calculating replacement pixel values associated with defective sensing elements of a detector array, the set of weighting coefficients including at least one negative weighting coefficient, wherein the set of weighting coefficients is generated using an empirical calculation and using calibration data of a calibration image, the calibration image data obtained with the detector array and a corresponding optical system,
obtain information identifying one or more defective sensing elements of the detector array,
receive image data of an image from the detector array,
calculate a weighted average of pixel values from sensing elements adjacent to a first defective sensing element of the detector array using at least some of the weighting coefficients, and
assign the weighted average to be a replacement pixel value for the first defective sensing element.

28. The apparatus of claim 27, wherein the empirical calculation for generating the weighting coefficients comprises:
assigning starting values to the weighting coefficients;
calculating test replacement data from the calibration data using existing values of the weighting coefficients;
calculating difference data from the test replacement data and the calibration data;
calculating an assessment parameter for the difference data;
determining whether the assessment parameter satisfies a predetermined condition; and
updating the weighting coefficients based upon the assessment parameter if the assessment does not satisfy the predetermined condition.

29. The apparatus of claim 28, wherein calculating test replacement data comprises:
selecting a pixel of the calibration data of the calibration image;
summing weighted contributions of pixel values in an area of the calibration image surrounding the selected pixel using existing values of the weighting coefficients to generate a sum;
assigning the sum to be a test replacement value for the selected pixel; and
repeating the three immediately preceding steps for each pixel of the calibration data of the calibration image.

30. A method of processing image data, comprising:
obtaining a set of weighting coefficients to be used in calculating replacement pixel values associated with defective sensing elements of a detector array, the set of weighting coefficients including at least one negative weighting coefficient, wherein the set of weighting coefficients is generated using an empirical calculation and using calibration data of a calibration image, the calibration data being obtained with the detector array and a corresponding optical system;
obtaining information identifying one or more defective sensing elements of the detector array;
receiving image data from the detector array;
calculating a weighted average of pixel values from sensing elements adjacent to a first defective sensing element of the detector array using at least some of the weighting coefficients; and
assigning the weighted average to be a replacement pixel value for the first defective sensing element.

31. The method of claim 30, wherein the empirical calculation for generating the weighting coefficients comprises:
assigning starting values to the weighting coefficients;
calculating test replacement data from the calibration data using existing values of the weighting coefficients;
calculating difference data from the test replacement data and the calibration data;
calculating an assessment parameter for the difference data;
determining whether the assessment parameter satisfies a predetermined condition; and
updating the weighting coefficients based upon the assessment parameter if the assessment does not satisfy the predetermined condition.

32. The method of claim 31, wherein calculating test replacement data comprises:
selecting a pixel of the calibration data of the calibration image;
summing weighted contributions of pixel values in an area of the calibration image surrounding the selected pixel using existing values of the weighting coefficients to generate a sum;
assigning the sum to be a test replacement value for the selected pixel; and
repeating the three immediately preceding steps for each pixel of the calibration data of the calibration image.

* * * * *